(12) United States Patent
Shiozaki et al.

(10) Patent No.: US 7,184,214 B2
(45) Date of Patent: Feb. 27, 2007

(54) DIFFRACTION GRATING ELEMENT, PRODUCTION METHOD OF DIFFRACTION GRATING ELEMENT, AND METHOD OF DESIGNING DIFFRACTION GRATING ELEMENT

(75) Inventors: Manabu Shiozaki, Osaka (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/287,448

(22) Filed: Nov. 28, 2005

(65) Prior Publication Data

US 2006/0139756 A1  Jun. 29, 2006

Related U.S. Application Data

(62) Division of application No. 10/764,497, filed on Jan. 27, 2004, now Pat. No. 7,019,904.

(60) Provisional application No. 60/447,710, filed on Feb. 19, 2003.

(30) Foreign Application Priority Data

Feb. 18, 2003 (JP) ............................. 2003-040196

(51) Int. Cl.
  *B02B 5/18* (2006.01)
(52) U.S. Cl. .................. 359/569; 359/576; 359/575
(58) Field of Classification Search ................ 359/569, 359/576, 575, 566, 573
  See application file for complete search history.

(56) References Cited

U.S. PATENT DOCUMENTS

| 4,484,797 A | 11/1984 | Knop et al. |
| 4,993,032 A | 2/1991 | Bradley |
| 5,598,300 A | 1/1997 | Magnusson et al. |
| 6,233,386 B1 | 5/2001 | Paek et al. |
| 2003/0076594 A1 | 4/2003 | Kramer |
| 2004/0125454 A1 | 7/2004 | Kawasaki et al. |

(Continued)

FOREIGN PATENT DOCUMENTS

JP  58-500916  6/1983

(Continued)

OTHER PUBLICATIONS

Kashiko Kodate; "Development of Diffractive Optics and Future Challenges"; *Japan Women's Bulletin*, Department of Mathematical and Physical Sciences, vol. 10; c. 2002; pp. 7-24.

(Continued)

*Primary Examiner*—Fayez G. Assaf
(74) *Attorney, Agent, or Firm*—McDermott Will & Emery LLP

(57) ABSTRACT

In a diffraction grating element 10, between a first medium 11 and a fourth medium 14, a second medium 12 and a third medium 13 are disposed alternately to form a diffraction grating. The light, which enters the diffraction grating from the first medium 11, is diffracted at the diffraction grating portion and output to a fourth medium 14. Or, the light, which enters the diffraction grating from the fourth medium 14, is diffracted at the diffraction grating portion and output to the first medium 11. The index of refraction $n_1$–$n_4$ of each medium satisfies a relational expression of "$n_3 < n_1 < n_2$, $n_3 \leq n_4 \leq n_2$" or "$n_3 \leq n_1 \leq n_2$, $n_3 < n_4 < n_2$".

17 Claims, 11 Drawing Sheets

U.S. PATENT DOCUMENTS

2004/0170356 A1  9/2004  Lazikov et al.
2004/0190578 A1  9/2004  Partio et al.

FOREIGN PATENT DOCUMENTS

| JP | 63-109402 | 5/1988 |
| JP | 05-273425 | 10/1993 |
| JP | 10-010306 | 1/1998 |
| JP | 2000-137109 | 5/2001 |
| JP | 2002-258034 | 9/2002 |
| WO | WO 83/00395 | 2/1983 |
| WO | WO 01/94996 | 12/2001 |

OTHER PUBLICATIONS

Hendrik J. Gerritsen et al.; "Rectangular Surface-Relief Transmission Gratings with a Very Large First-Order Diffraction Efficiency (-95%) for Unpolarized Light"; *Applied Optics*; vol. 37, No. 25; c. 1998; pp. 5823-5829.

Shuhei Tanaka, Lecture entitled: "Glass Materials for Optical Waveguiding Nanoglass Devices", Summary of Workshop on Nanotech-Material Associated With Devices, 2002, pp. 125-127, Japan.

Tatsuya Horii, "Epoch of Light Caused By Nano Glass" Nanotech Weekly, vol. 1133, pp. 6-21, 2003, Japan.

US 7,184,214 B2

DIFFRACTION GRATING ELEMENT, PRODUCTION METHOD OF DIFFRACTION GRATING ELEMENT, AND METHOD OF DESIGNING DIFFRACTION GRATING ELEMENT

RELATED APPLICATIONS

This application is a divisional of U.S. application Ser. No. 10/764,497 filed Jan. 27, 2004 now U.S. Pat. No. 7,019,904, which claims priority to Japanese Application No. 2003-040196 filed Feb. 18, 2003 and Provisional Application Ser. No. 60/447,710 filed on Feb. 19, 2003, which are hereby incorporated by reference in their entirety.

BACKGROUND OF THE INVENTION

1. Field of the Invention

The present invention relates to a transmission diffraction grating element, a production method of diffraction grating element and a method of designing diffraction grating element.

2. Related Background of the Invention

Generally, a diffraction grating element is, in a transparent flat plate having a first plane and a second plane parallel to each other, formed with a diffraction grating on the first plane (see Kashiko Kodate, "Development of diffractive optics and future challenges"; Japan Women's University Journal, Faculty of Science, 10th Edition, pages 7 to 24 (2002), for example). In the diffraction grating element, for example, when light enters the first plane from a medium, which is in contact with the first plane, at a constant incident angle, the light is diffracted by the diffraction grating formed on the first plane, transmitted within the transparent flat plate, and then emitted to a medium, which is in contact with the second plane. The diffraction angle of the light, which is emitted from the second plane of the transparent flat plate, varies according to the wavelength.

Thus, the diffraction grating element may be used as an optical demultiplexer in which incident light is demultiplexed and then emitted. Also, when the light is guided in the direction opposite to the above case, the diffraction grating element may be used as an optical multiplexer in which incident light is multiplexed and then emitted. Further, by combining the diffraction grating element with another optical elements, a dispersion regulator, which regulates the group delay time of the light in accordance with the wavelength, may be constituted, for example. Accordingly, the diffraction grating element is one of the important optical elements in the wavelength division multiplexing (WDM) optical communication system, in which multiple wavelength signal light is multiplexed and then transmitted.

In the diffraction grating element, high diffraction efficiency is required. Some structural artifices for improving the diffraction efficiency have been proposed; and it is reported that about 95% diffraction efficiency has been achieved (see US Patent Application Publication No. 2002/0135876; Specification; and, Hendrick J. Gerritsen, et al., "Rectangular surface-relief transmission gratings with a very large first-order diffraction efficiency (~95%) for unpolarized light", Applied Optics, Vol. 37, No. 25, pp. 5823–5829 (1998), for example).

SUMMARY OF THE INVENTION

However, the incident angle of the incident light, which enters the diffraction grating element, or the diffraction angle of the diffracted light, which is diffracted and then emitted from the diffraction grating element is not 0° (perpendicular to the first plane or second plane of the transparent flat plate provided with diffraction grating). Accordingly, the polarization dependence due to the reflection is generated. In addition, the diffraction grating has such structure that the index of refraction changes periodically to one direction. Accordingly, particularly, in the case where the grating period is short (for example, 2λ or less), when the angle between the periodic direction and the polarization direction changes, the diffraction efficiency changes. As described above, generally, the diffraction efficiency of the diffraction grating element has the polarization dependence; and the diffraction efficiency of TE polarized light and TM polarized light is different from each other. Particularly, when the angular dispersion of the diffraction angle is large (wavelength resolution in multiplexing/demultiplexing is high), the period becomes shorter. Accordingly, the polarization dependence becomes remarkable.

It is possible to reduce the difference in the diffraction efficiency between the TE polarized light and the TM polarized light, by appropriately designing the sectional configuration (height, width or like of the grating) of the diffraction grating so that the polarization dependence due to the reflection and the polarization dependence due to the structure are canceled. However, even when so designed as described above, it is impossible to improve the diffraction efficiency and reduce the polarization dependence of the diffraction efficiency in a wide wavelength band.

The present invention has been accomplished to solve the above-described problems. An object of the present invention is to provide a diffraction grating element capable of improving the diffraction efficiency and reducing the diffraction efficiency in a wide wavelength band by canceling the polarization dependence due to the reflection and the polarization dependence due to the structure respectively. Also, another object of the present invention is to provide a method of fabricating or designing such diffraction grating element.

A diffraction grating element in accordance with a first invention comprises, (1) given a first plane and a second plane parallel with each other, a first medium (index of refraction $n_1$) provided at the outer side than the first plane being in contact with the first plane, (2) a second medium (index of refraction $n_2$) and a third medium (index of refraction $n_3$, $n_3<n_2$) disposed alternately in a predetermined direction parallel with the first plane between the first plane and the second plane being in contact with the first plane and the second plane to constitute a diffraction grating, and (3) a fourth medium (index of refraction $n_4$) provided at the outer side than the second plane being in contact with the second plane. And Each of indexes of refraction $n_1$–$n_4$ of the first medium, the second medium, the third medium and the fourth medium satisfies a relational expression of "$n_3<n_1<n_2, n_3 \leq n_4 \leq n_2$", or "$n_3 \leq n_1 \leq n_2, n_3<n_4<n_2$". Further, the diffraction grating element is characterized in that both of the second medium and the third medium are solid; or, the first medium or the fourth medium is made of an isotropic material.

In the diffraction grating element in accordance with the first invention, between the first medium and the fourth medium, the second medium and the third medium are disposed alternately to constitute the diffraction grating. The light, which enters the diffraction grating from the first medium, is diffracted at the diffraction grating portion and output to the fourth medium. Or, the light, which enters the diffraction grating from the fourth medium, is diffracted at the diffraction grating portion and output to the first medium. In the diffraction grating element, the index of refraction of each medium satisfies the above relational expressions. Accordingly, it is possible to improve the diffraction efficiency and to reduce the polarization dependence of the diffraction efficiency in a wide wavelength band.

In the diffraction grating element in accordance with the first invention, given that an average index of refraction between the first plane and the second plane is $n_{av}$, it is preferred that the index of refraction $n_1$ of the first medium satisfies a relational expression of "$n_{av}-0.2 \leq n_1 \leq n_{av}+0.2$"; and further, it is preferred that the index of refraction $n_4$ of the fourth medium satisfies a relational expression of "$n_{av}-0.2 \leq n_4 \leq n_{av}+0.2$". Further, it is preferred that the thickness of the first medium with respect to a direction perpendicular to the first plane is 5 μm or more; and further, it is preferred that the thickness of the fourth medium with respect to a direction perpendicular to the first plane is 5 μm or more. These cases are further preferred for improving the diffraction efficiency and for reducing the polarization dependence of the diffraction efficiency in a wide wavelength band.

A diffraction grating element in accordance with a second invention comprises, (1) given first–fourth planes disposed parallel with each other in order, a first medium (index of refraction $n_1$) provided at the outer side than the first plane being in contact with the first plane, (2) a second medium (index of refraction $n_2$) and a third medium (index of refraction $n_3$, $n_3<n_2$) disposed alternately in a predetermined direction parallel with the first plane between the second plane and the third plane being in contact with the second plane and the third plane to constitute a diffraction grating, (3) a fourth medium (index of refraction $n_4$) provided at the outer side than the fourth plane being in contact with the fourth plane, (4) a fifth medium (average index of refraction $n_5$) provided between the first plane and the second plane being in contact with the first plane and the second plane, and (5) a sixth medium (average index of refraction $n_6$) provided between the third plane and the fourth plane being in contact with the third plane and the fourth plane. And, given that an average index of refraction between the second plane and the third plane is $n_{av}$, the average index of refraction $n_5$ of the fifth medium satisfies a relational expression of "$n_1<n_5<n_{av}$" or "$n_{av}<n_5<n_1$", and the average index of refraction $n_6$ of the sixth medium satisfies a relational expression of "$n_4<n_6<n_{av}$" or "$n_{av}<n_6<n_4$".

In the diffraction grating element in accordance with the second invention, between the fifth medium and the sixth medium, the second medium and the third medium are disposed alternately to constitute the diffraction grating. The light, which enters the diffraction grating from the first medium, passes through the fifth medium, and is diffracted at the diffraction grating portion, and output to the fourth medium through the sixth medium. Or, the light, which enters the diffraction grating from the fourth medium, passes through the sixth medium, and is diffracted at the diffraction grating portion, and output to the first medium through the fifth medium. In the diffraction grating element, the index of refraction of each medium satisfies the above relational expressions. Accordingly, it is possible to improve the diffraction efficiency and to reduce the polarization dependence of the diffraction efficiency in a wide wavelength band.

In the diffraction grating element in accordance with the second invention, it is preferred that the index of refraction $n_5$ of the fifth medium satisfies a relational expression of "$(n_1 n_{av})^{1/2}-0.2<n_5<(n_1 n_{av})^{1/2}+0.2$"; and further, it is preferred that the index of refraction $n_6$ of the sixth medium satisfies a relational expression of "$(n_4 n_{av})^{1/2}-0.2<n_6<(n_4 n_{av})^{1/2}+0.2$". Further, it is preferred that, given that the period of the diffraction grating is Λ; the thickness of the fifth medium with respect to a direction perpendicular to the first plane is $h_5$; and given that the light with wavelength λ enters the diffraction grating, the wavelength λ of the light which satisfies a relational expression of "$\lambda \Lambda/4(4n_5^2\Lambda^2-\lambda^2)^{1/2}<h_5<3\lambda\Lambda/4(4n_5^2\Lambda^2-\lambda^2)^{1/2}$" is present in a waveband of 1.26 μm–1.675 μm. And further, it is preferred that, given that the period of the diffraction grating is Λ; the thickness of the sixth medium with respect to a direction perpendicular to the first plane is $h_6$; and given that the light with wavelength λ enters the diffraction grating, the wavelength λ of the light which satisfies a relational expression of "$\lambda \Lambda/4(4n_6^2\Lambda^2-\lambda^2)^{1/2}<h_6<3\lambda\Lambda/4(4n_6^2\Lambda^2-\lambda^2)^{1/2}$" is present in a waveband of 1.26 μm–1.675 μm. These cases are further preferred for improving the diffraction efficiency and for reducing the polarization dependence of the diffraction efficiency in a wide wavelength band.

Further, it is preferred that the fifth medium is made of a plurality of media disposed alternately in a predetermined direction. And further, it is preferred that the sixth medium is made of a plurality of media disposed alternately in a predetermined direction. In this case, it is possible to improve the diffraction characteristics as well as it is preferred for producing the diffraction grating element.

A diffraction grating element in accordance with a third invention comprises, (1) given first-third planes disposed parallel with each other in order, a first medium (index of refraction $n_1$) provided at the outer side than the first plane being in contact with the first plane, (2) a second medium (index of refraction $n_2$) and a third medium (index of refraction $n_3$, $n_3<n_2$) disposed alternately in a predetermined direction parallel with the first plane between the second plane and the third plane being in contact with the second plane and the third plane to constitute a diffraction grating, (3) a fourth medium (index of refraction $n_4$) provided at the outer side than the third plane being in contact with the third plane, and (5) a fifth medium (average index of refraction $n_5$) provided between the first plane and the second plane being in contact with the first plane and the second plane. And, given that the average index of refraction between the second plane and the third plane is $n_{av}$, the average index of refraction $n_5$ of the fifth medium satisfies a relational expression of "$n_1<n_5<n_{av}$" or "$n_{av}<n_5<n_1$".

In the diffraction grating element in accordance with the third invention, between the fourth medium and the fifth medium, the second medium and the third medium are disposed alternately to constitute the diffraction grating. The light, which enters the diffraction grating from the first medium, passes through the fifth medium, and is diffracted at the diffraction grating portion, and output to the fourth medium. Or, the light, which enters the diffraction grating from the fourth medium, is diffracted at the diffraction grating portion and output to the first medium through the fifth medium. In the diffraction grating element, the index of refraction of each medium satisfies the above relational expression. Accordingly, it is possible to increase the diffraction efficiency and to improve the polarization dependence of the diffraction efficiency in a wide wavelength band.

In the diffraction grating element in accordance with the third invention, it is preferred that the index of refraction $n_5$ of the fifth medium satisfies a relational expression of "$(n_1 n_{av})^{1/2}-0.2<n_5<(n_1 n_{av})^{1/2}+0.2$". Further, given that the period of the diffraction grating is Λ; the thickness of the fifth medium with respect to a direction perpendicular to the first plane is $h_5$; and given that the light with wavelength $\lambda$ enters the diffraction grating, the wavelength $\lambda$ of the light which satisfies a relational expression of "$\lambda\Lambda/4(4n_5^2\Lambda^2-\lambda^2)^{1/2} < h_5 < 3\lambda\Lambda/4(4n_5^2\Lambda^2-\lambda^2)^{1/2}$" is present in a waveband of 1.26 μm–1.675 μm. It is preferred that each index of refraction $n_2$–$n_4$ of the second medium, the third medium and the fourth medium satisfies a relational expression of "$n_3 < n_4 < n_2$". It is preferred that the index of refraction $n_4$ of the fourth medium satisfies a relational expression of "$n_{av}-0.2 \leq n_4 \leq n_{av}+0.2$". Further, it is preferred that the thickness of the fourth medium with respect to a direction perpendicular to the first plane is 5 μm or more. These cases are further preferred for improving the diffraction efficiency and for reducing the polarization dependence of the diffraction efficiency in a wide wavelength band.

It is preferred that the fifth medium is made of a plurality of media disposed alternately in a predetermined direction. In this case, it is possible to improve the diffraction characteristics as well as it is preferred for producing the diffraction grating element.

A diffraction grating element in accordance with a fourth invention comprises a base plate, a first reflection-inhibiting portion provided on the base plate, a diffraction grating portion provided on the first reflection-inhibiting portion, and a second reflection-inhibiting portion provided on the diffraction grating portion, wherein the second reflection-inhibiting portion is in contact with a first medium, in the diffraction grating portion, a second medium and a third medium are disposed alternately in a predetermined direction parallel with the base plate to constitute a diffraction grating, and in a waveband of 1.26 μm–1.675 μm, a wavelength of which reflectance is 10% or less is present. According to this diffraction grating element, it is possible to increase the diffraction efficiency and to reduce the polarization dependence of the diffraction efficiency in a wide wavelength band.

In the diffraction grating element in accordance with a fourth invention, a diffraction capacity of the diffraction grating portion is larger than 50% of the entire diffraction capacity including the diffraction grating portion, the first reflection-inhibiting portion and the second reflection-inhibiting portion. It is preferred that the modulation of the index of refraction of the diffraction grating portion is larger than the modulation of the index of refraction of the first reflection-inhibiting portion and the second reflection-inhibiting portion. Also, it is preferred that the maximum refraction of the diffraction grating portion is larger than the index of refraction of the base plate and the first medium. Further, it is preferred that the period of the diffraction grating is 1.675 μm or less.

In the diffraction grating element in accordance with the first-fourth inventions, it is preferred that a wavelength of the light, in which the diffraction efficiency of the TE polarized light and the TM polarized light is 90% or more, respectively, is present. Also, it is preferred that a wavelength of the light, in which the difference of the diffraction efficiency between the TE polarized light and the TM polarized light is 5% or less, is present. In these cases, in an optical communication system that multiplexes and transmits signal light with multiple wavelengths, this diffraction grating element can be appropriately used.

In the diffraction grating element in accordance with the first-fourth inventions, it is preferred that the difference between the index of refraction $n_2$ of the second medium and the index of refraction $n_3$ of the third medium is 0.7 or more. It is preferred that the second medium is made of any one of $TiO_2$, $Ta_2O_5$ and $Nb_2O_5$; and the third medium is constituted of a gas. In these cases, since the height of the diffraction grating portion can be reduced, the diffraction grating element can be produced easily.

In the diffraction grating element in accordance with the first-fourth inventions, it is preferred that the second medium or the third medium are made of a predetermined material of which index of refraction changes by an irradiation of energy beam; and it is preferred that the predetermined material is a diamond-like carbon. In these cases, the diffraction grating element with desired characteristics can be produced easily.

It is preferred that, in the diffraction grating element in accordance with the first invention, the first medium or the fourth medium is made of a predetermined material of which etching rate is slower than that of the second medium or the third medium. It is preferred that, in the diffraction grating element in accordance with the second invention, the fifth medium or the sixth medium is made of a predetermined material of which etching rate is slower than that of the second medium or the third medium. In the second invention, when the fifth medium or sixth medium is subjected to the etching, it is preferred that the first medium or the fourth medium is made of a predetermined material of which etching rate is slow. Further, it is preferred that, in the diffraction grating element in accordance with the third invention, the fourth medium or the fifth medium is made of a predetermined material of which etching rate is slower than that of the second medium or the third medium. In the third invention, when the fifth medium is subjected to the etching, it is preferred that the first medium is made of a predetermined material of which etching rate is slow. As described above, it is preferred that, for a non-etching layer, which is in contact with an etching layer, a material of which etching rate is slow; for example; it is preferred that the ratio of the etching rate is twice or more is used. Here, it is preferred that the above-described predetermined materials are any of $Al_2O_3$, $MgO$, $Nd_2O_3$ and a fluorinated compound; and it is preferred that the second medium or the third medium is any of $TiO_2$, $Nb_2O_5$, $Ta_2O_5$, $SiN$, $SiO_2$, $SiO$, $ZrO_2$ and $Sb_2O_3$. These cases are preferable for producing the diffraction grating element by etching.

A production method of a diffraction grating element in accordance with the present invention is a production method of the diffraction grating element in accordance with the above-described first–fourth inventions. The method comprises the steps of: forming a layer constituted of a predetermined material of which index of refraction changes by an irradiation of an energy beam; and irradiating an energy beam onto the layer with a spatial strength modulation pattern to form a diffraction grating, in which the second medium and the third medium with an index of refraction different from each other, are disposed alternately in the layer. Or, the method comprises the steps of: forming a layer formed of a predetermined material; and performing an etching on the layer with a predetermined spatial pattern to form a diffraction grating, in which the second medium and the third medium with an index of refraction different from each other, are disposed alternately in the layer.

A designing method of the diffraction grating element of the present invention is a designing method of a diffraction grating element having a diffraction grating portion of which index of refraction changes periodically in a predetermined direction and a reflection-inhibiting portion on at least one of the top and the bottom of the diffraction grating portion, comprising the steps of determining so that each of the diffraction grating portion and the reflection-inhibiting portion is formed with a film having an average index of refraction by the media included therein respectively, setting the phase change of light at the diffraction grating portion to 90°, and deriving refraction distribution of the diffraction grating element so that the reflectance is 10% or less at a desired wavelength. According to the designing method of the diffraction grating element, result of analysis can be obtained close to the characteristics of an actually produced diffraction grating element. Accordingly, the diffraction grating element can be designed easily.

DESCRIPTION OF THE PREFERRED EMBODIMENTS

Referring to the accompanying drawings, embodiments of the present intention will be described in detail. The same reference symbols have been assigned to the same elements or parts in the description of the drawings, and repetitive description is omitted.

(First Embodiment)

Figure 1:
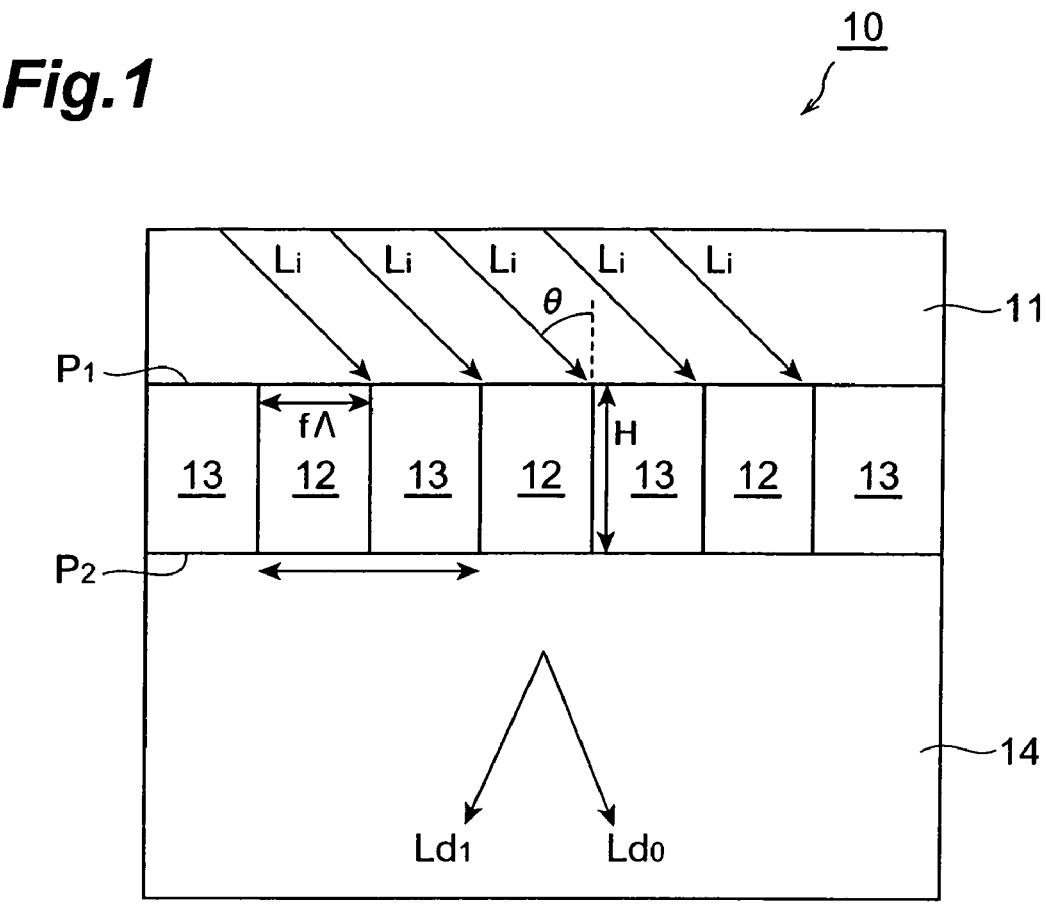
FIG. 1 is an explanatory diagram of a diffraction grating element 10 in accordance with a first embodiment.

First of all, a first embodiment of a diffraction grating element in accordance with the present invention will be described. FIG. 1 is an explanatory diagram of a diffraction grating element 10 in accordance with the first embodiment. The diagram shows a section of the diffraction grating element 10 when the same is cut off at a plane perpendicular to the grating. The diffraction grating element 10 shown in the diagram comprises a first medium 11, a second medium 12, a third medium 13 and a fourth medium 14.

In this diffraction grating element 10, a first plane $P_1$ and a second plane $P_2$, which are parallel to each other, are assumed. Here, the first medium 11 is provided at the outer side than the first plane $P_1$ (upper side in the diagram) being in contact with the first plane $P_1$. Between the first plane $P_1$ and the second plane $P_2$, the second medium 12 and the third medium 13 are disposed alternately in a predetermined direction parallel to the first plane $P_1$ being in contact with the first plane $P_1$ and the second plane $P_2$ so as to constitute a diffraction grating. Also, the fourth medium 14 is provided at the outer side than the second plane $P_2$ (lower side in the diagram) being in contact with the second plane $P_2$. Both of the second medium 12 and the third medium 13 are solid respectively; or, the first medium 11 or the fourth medium 14 is made of an isotropic material.

In the diffraction grating element 10, between the first medium 11 and the fourth medium 14, the second medium 12 and the third medium 13 are provided alternately to form a diffraction grating. The light Li (incident angle θ), which enters the diffraction grating from the first medium 11, is diffracted at the diffraction grating portion and emitted to the fourth medium 14 (in FIG. 1, zero-order light $Ld_0$ and first-order diffracted light $Ld_1$ are shown). Or, the light, which enters the diffraction grating from the fourth medium 14, is diffracted at the diffraction grating portion, and emitted to the first medium 11.

Each region in the second medium 12 and the third medium 13 has a region of which section is rectangular. In the diffraction grating portion constituted of the diffraction grating, which is formed of the second medium 12 and the third medium 13 being disposed in a predetermined direction alternately, given that the period of the diffraction grating is Λ; and the ratio that the second medium 12 occupies in the period Λ (duty ratio) is f. Given that the distance between the first plane $P_1$ and the second plane $P_2$ (i.e., height of the grating) is H. Given that the index of refraction of the first medium 11 is $n_1$; the index of refraction of the second medium 12 is $n_2$; the index of refraction of the third medium 13 is $n_3$ ($n_3<n_2$); and the index of refraction of the fourth medium 14 is $n_4$.

Here, the average index of refraction $n_{av}$ of the diffraction grating portion between the first plane $P_1$ and the second plane $P_2$ is expressed by the following expression:

$$n_{av}=\sqrt{fn_2^2+(1-f)n_3^2} \qquad (1)$$

Also, the average index of refraction $n_{av}$ is between the index of refraction $n_2$ of the second medium 12 and the index of refraction $n_3$ of the third medium 13, and satisfies the following relational expression:

$$n_3 < n_{av} < n_2 \qquad (2)$$

In the case where the period $\Lambda$ of the diffraction grating is equal to the order or less (for example, 2$\Lambda$ or less) of the wavelength $\lambda$ of the incident light, when considering the reflection of the light at the first plane $P_1$ and the second plane $P_2$ respectively, the portion between the first plane $P_1$ and the second plane $P_2$ may be replaced with a medium having a uniform index of refraction $n_{av}$. Here, when the index of refraction $n_1$ of the first medium 11 or the index of refraction $n_4$ of the fourth medium 14 is closer to the average index of refraction $n_{av}$ of the diffraction grating portion, the more reflection at the first plane $P_1$ or the second plane $P_2$ is reduced and the diffraction characteristics are improved.

Accordingly, in this embodiment, the indexes of refraction $n_1$–$n_4$ of each medium satisfy the following relational expression:

$$n_3 < n_1 < n_2, \ n_3 \leq n_4 \leq n_2 \qquad (3a), \text{ or}$$

$$n_3 \leq n_1 \leq n_2, \ n_3 < n_4 < n_2 \qquad (3b)$$

Further, the indexes of refraction $n_1$–$n_4$ of each medium preferably satisfy the following relational expression:

$$n_{av} - 0.2 \leq n_1 \leq n_{av} + 0.2 \qquad (4a), \text{ or}$$

$$n_{av} - 0.2 \leq n_4 \leq n_{av} + 0.2 \qquad (4b).$$

In accordance with the above expression (3) or expression (4), the indexes of refraction $n_1$–$n_4$ of each medium are determined; and then, the diffraction characteristics of the diffraction grating element 10 is analyzed by means of the rigorous coupled-wave analysis (RCWA). The duty ratio f, the grating period $\Lambda$ and the height of the grating H are optimized by means of an optimizing technique (for example, nonlinear programming, simulated annealing, genetic algorithm or the like). Thereby, the diffraction grating element 10 with satisfactory diffraction characteristics is designed.

Next, examples of the diffraction grating element 10 in accordance with the first embodiment will be described along with a comparative example. In the diffraction grating element 10 of an example 1, the first medium 11 and the fourth medium 14 are constituted of a silica glass respectively ($n_1 = n_4 = 1.45$); the index of refraction $n_2$ of the second medium 12 is 1.75; the third medium 13 is constituted of air ($n_3 = 1$); the duty ratio f is 0.70; the grating period $\Lambda$ is 1.01 μm; and the height of the grating H is 2.26 μm. In the diffraction grating element of a comparative example 1, the first medium and the third medium are constituted of air respectively ($n_1 = n_3 = 1$); the second medium and the fourth medium are constituted of silica glass respectively ($n_2 = n_4 = 1.45$); the duty ratio f is 0.84; the grating period $\Lambda$ is 1.01 μm; and the height of the grating H is 6.02 μm.

Figure 2:
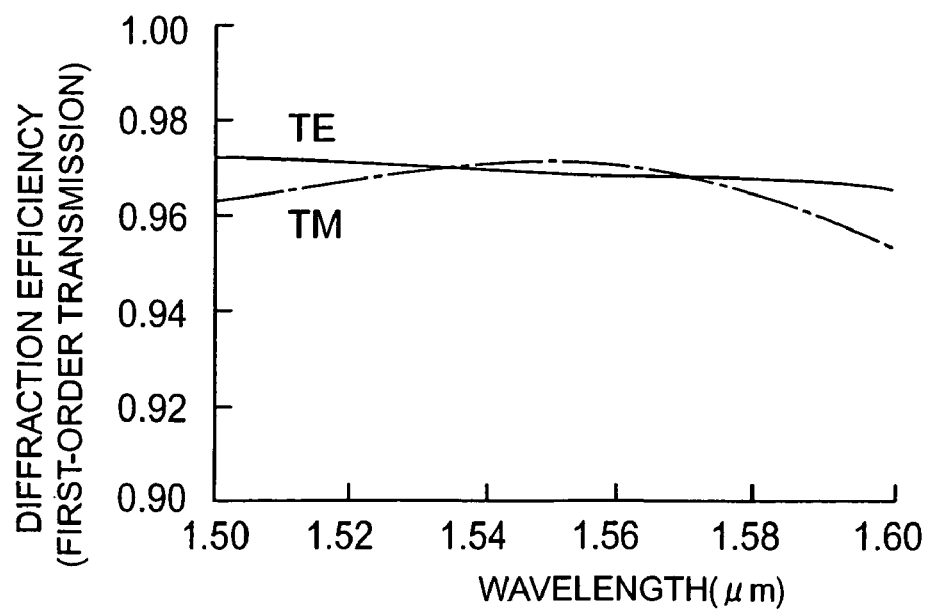
FIG. 2 is a graph showing the diffraction characteristics of the diffraction grating element 10 in accordance with an example 1.
Figure 3:
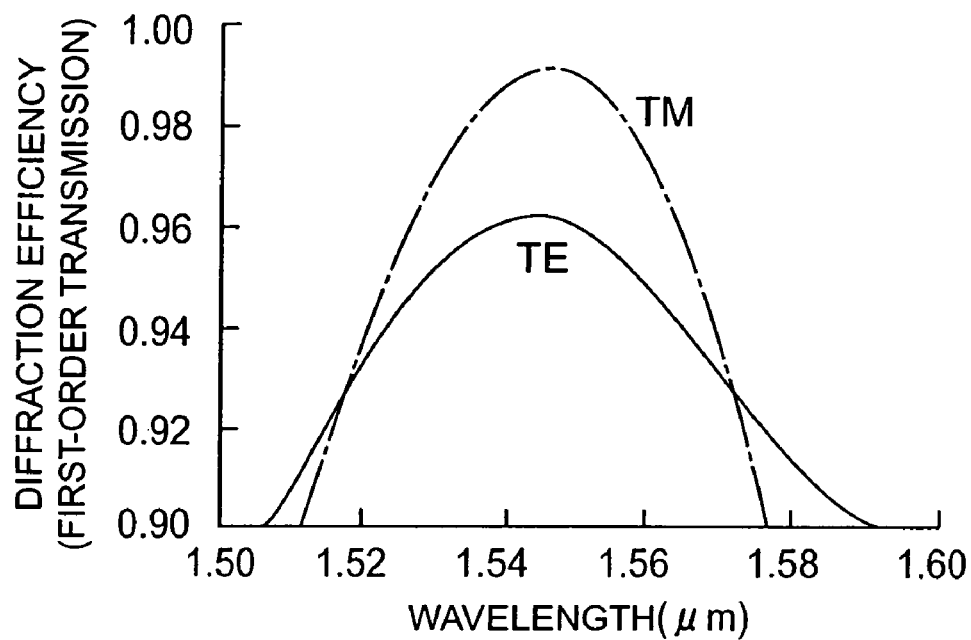
FIG. 3 is a graph showing the diffraction characteristics of a diffraction grating element in accordance with a comparative example 1.

FIG. 2 is a graph showing the diffraction characteristics of the diffraction grating element 10 of an example 1. FIG. 3 is a graph showing the diffraction characteristics of the diffraction grating element of a comparative example 1. In these diagrams, the wavelength dependence of the diffraction efficiency when the incident angle θ of the light is the Bragg incident angle at the wavelength of 1.55 μm is shown with respect to TE polarized light and TM polarized light respectively. The wording "Bragg incident angle" means the incident angle in which the respective angles of the zero-order light and the first-order light are equal to each other. In these example 1 and comparative example 1, the parameter was designed so that, at waveband of 1.52 μm–1.57 μm, the polarization dependence and the wavelength dependence of the diffraction efficiency become as small as possible; and the diffraction efficiency becomes as large as possible.

As demonstrated in these diagrams being compared with each other, compared with the case of comparative example 1 (FIG. 3), in the case of example 1 (FIG. 2), in a wide wavelength band, the diffraction efficiency of the TE polarized light and the TM polarized light are high as 95% or more; and the difference of the diffraction efficiency between the TE polarized light and the TM polarized light was 2% or less. Thus, the diffraction grating element 10 in accordance with this embodiment can improve the diffraction efficiency and reduce the polarization dependence of the diffraction efficiency in a wide wavelength band.

Figure 4:
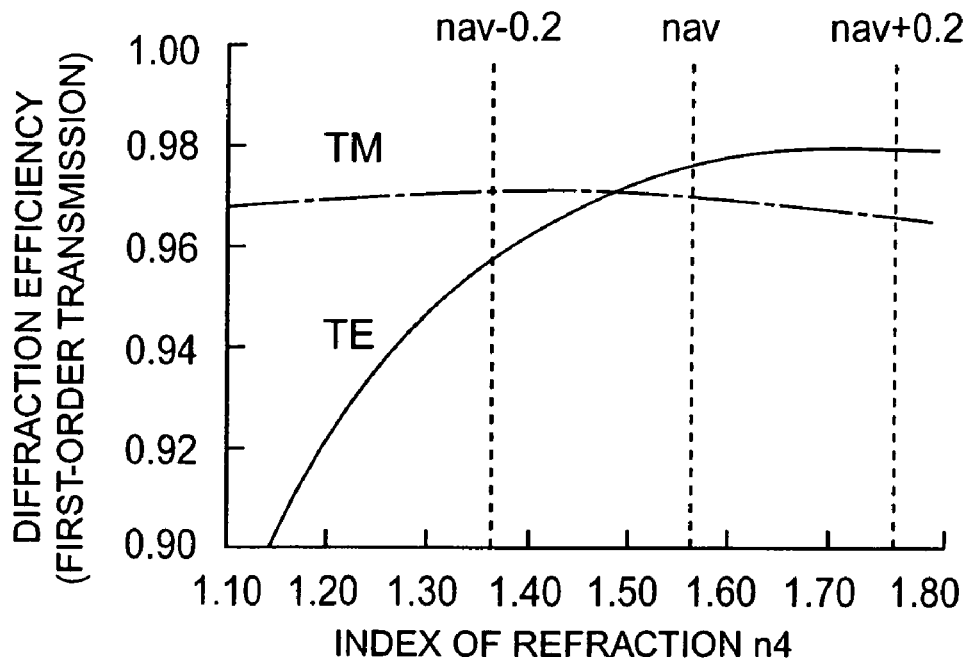
FIG. 4 is a graph showing a relationship between the diffraction efficiency of the diffraction grating element 10 in accordance with example 1 and the index of refraction $n_4$ of a fourth medium 14.

FIG. 4 is a graph showing a relationship between the diffraction efficiency of the diffraction grating element 10 and the index of refraction $n_4$ of the fourth medium 14 of the example 1. Here, the wavelength $\lambda$ was fixed to 1.55 μm. As demonstrated in the diagram, when the index of refraction $n_4$ of the fourth medium 14 satisfies the relational expression of the above expression (4b), the diffraction efficiency is large, and the polarization dependence is small.

Next, several production methods of the diffraction grating element 10 in accordance with the first embodiment will be described.

In the first production method, a layer of the second medium 12 is formed on the fourth medium 14; on that layer, grooves with a predetermined spatial pattern are formed by etching; and the first medium 11 is laminated thereon. In this case, groove regions, which are formed by the etching, are the third medium 13 constituted of air. Or, in the groove regions, which are formed by the etching, another material, which will serve as the third region 13, is embedded by means of CVD (Chemical Vapor Deposition) or the like; and then, the height of the second region 12 and the third region 13 is aligned with each other by means of polishing or the like, and the first medium 11 may be formed thereon. Here, in the case where both of the second region 12 and the third region 13 are solid, it is possible to prevent a shape of the grooves from being deformed due to the pressure when being laminated to the first medium 11. And further, when the first medium 11 is formed by means of the CVD or the like, it is preferably possible to prevent the first medium 11 from entering the grooves. On the surface of the fourth medium 14, a layer of, not the second medium 12 but the third medium 13, may be formed.

When the layer, which is constituted of the second medium 12 or third medium 13, is subjected to the etching, it is preferred that the fourth medium 14 is constituted of a predetermined material, of which etching rate is slower than that of the second medium 12 or third medium 13. In such case, it is possible to terminate the etching at the upper surface of the fourth medium 14 (second plane $P_2$). From the above viewpoint, it is preferred that, for example, the fourth medium 14 is constituted of any one of $Al_2O_3$, MgO, $Nd_2O_3$ and fluorinated compound ($AlF_3$, $MgF_2$, $CaF_2$, $NdF_3$ or the like). Also, it is preferred that the second medium 12 or the third medium 13 is constituted of any one of $TiO_2$, $Nb_2O_5$, $Ta_2O_5$, SiN, $SiO_2$, SiO, $ZrO_2$ and $Sb_2O_3$.

In place of the above etching, the second medium 12 and the third medium 13 may be formed alternately by means of lift-off or the like.

In any case of the etching and the lift-off, the lower height of the grating H allows the easier forming of the grooves. In the first embodiment, the index of refraction $n_1$–$n_4$ of each medium can be arranged separately. Accordingly, the difference ($n_2$–$n_3$) between the index of refraction $n_2$ of the second medium 12 and the index of refraction $n_3$ of the third medium 13 can be made large; thus the height of the grating H can be made lower. From the above viewpoint, when the difference ($n_2$–$n_3$) between the index of refraction $n_2$ of the second medium 12 and the index of refraction $n_3$ of the third medium 13 is 0.7 or more, the height of the grating H can be 3 μm or less; thus the fabricating thereof is preferably made easier. Therefore, to achieve the above, the second medium 12 is preferably formed of any one of $TiO_2$, $Ta_2O_5$ and $Nb_2O_5$, and the third medium 13 is preferably constituted of a gas. When both of the second medium and the third medium are solid, as the third medium, a material with low index of refraction such as $MgF_2$ (index of refraction 1.35) is used; and as the second medium, a material with high index of refraction such as a semiconductor, for example, Si (index of refraction 3.5) is further preferably used.

In the second production method, on the surface of the fourth medium 14, a layer constituted of a predetermined material, of which index of refraction can be changed by an irradiation of an energy beam (for example, X-ray, corpuscular beam or the like), is formed. Onto the layer, the energy beam is irradiated with a predetermined spatial strength-modulating pattern. In that layer, a diffraction grating formed of the second medium 12 and the third medium 13 disposed alternately, which have the index of refraction different from each other, is formed; and the first medium 11 is formed thereon. Or, on a layer of a predetermined material, the first medium 11 is formed, and then, the energy beam is irradiated onto the layer using a predetermined spatial strength modulating pattern to preferably form the diffraction grating, in which the second medium 12 and the third medium 13, which have the index of refraction different from each other, are disposed alternately on the layer.

As the predetermined material, of which index of refraction can be changed by an irradiation of energy beam, a diamond-like carbon (DLC) is preferably used. In this case, as the energy beam, which is irradiated to change the index of refraction of the diamond-like carbon, a synchrotron radiation (SR light) or hydrogen ion beam is used. The index of refraction of the region of the diamond-like carbon, where is irradiated with the energy beam, becomes larger. That is, the region, where is not subjected to the irradiation of the energy beam, serves as the third medium 13 (index of refraction $n_3$), and the region, where has been subjected to the irradiation of the energy beam, serves as the second medium 12 (index of refraction $n_2$).

Compared to the first production method, the second production method is preferred in a point that the fabricating of the diffraction grating element 10 is simple. Further, in the first production method, it is difficult to form the configuration of the section of the grooves, which is formed with the etching, into a perfect rectangle. Contrary to this, in the second production method, it is preferred in the point that each sectional configuration of the regions of the second medium 12 and the third medium 13 can be formed into a further complete rectangle.

Figure 5:
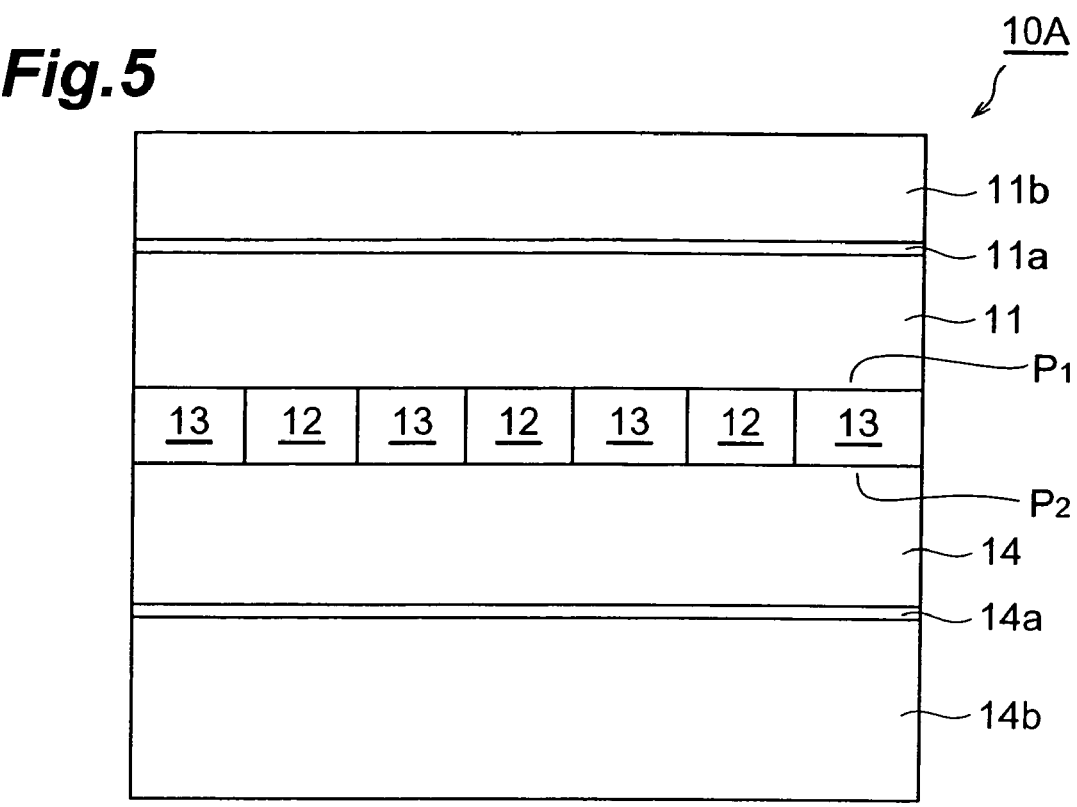
FIG. 5 is an explanatory diagram of a diffraction grating element 10A in accordance with a modified example 1.

Next, modified examples of the diffraction grating element 10 in accordance with the first embodiment will be described. FIG. 5 is an explanatory diagram of a diffraction grating element 10A in accordance with a modified example 1. In the diffraction grating element 10A in accordance with the modified example 1 shown in the diagram, compared with the constitution of the above-described diffraction grating element 10, at the outer side (upper side in the diagram) of the first medium 11 (index of refraction $n_1$), a reflection reducing film 11a is formed; and further, at the outside of the reflection reducing film 11a, there resides a medium 11b (index of refraction $n_0$); also, at the outside (lower side in the diagram) of the fourth medium 14 (index of refraction $n_4$), a reflection reducing film 14a is formed; and further, at the outside of the reflection reducing film 14a, there resides a medium 14b (index of refraction $n_5$). For example, the outside medium 11b and medium 14b is constituted of air, or an optical glass for controlling the linear expansion coefficient of the entire diffraction grating element 10A for reducing the temperature dependence of the optical characteristics.

In the diffraction grating element 10A of the modified example 1, in order to allow the evanescent wave, which is generated in the diffraction grating, to be satisfactorily attenuated, it is preferred that each thickness of the first medium 11 and the fourth medium 14 (thickness with respect to the direction perpendicular to the first plane $P_1$) is satisfactorily thicker than the wavelength λ. For example, when the wavelength λ is 1.55 μm, each thickness of the first medium 11 and the fourth medium 14 is preferably 5 μm or more. Also, between the first medium 11 and the outer medium 11b, the reflection reducing film 11a is provided; and between the fourth medium 14 and the outer medium 14b, the reflection reducing film 14a is provided. Accordingly, the reflection at the boundary face therebetween is reduced, and thus, the diffraction characteristics are prevented from being degraded.

Here, when the first medium 11 or the fourth medium 14 is constituted of an isotropic material, since the polarization mode dispersion occurs, or the state of the polarization changes, an influence is rendered on the optical communication. However, by forming the first medium 11 and the fourth medium 14 with an isotropic material, these influences can be reduced. Further, the design for reducing the reflection at the reflection reducing film 11a and the reflection reducing film 14a can be made easily.

Figure 6:
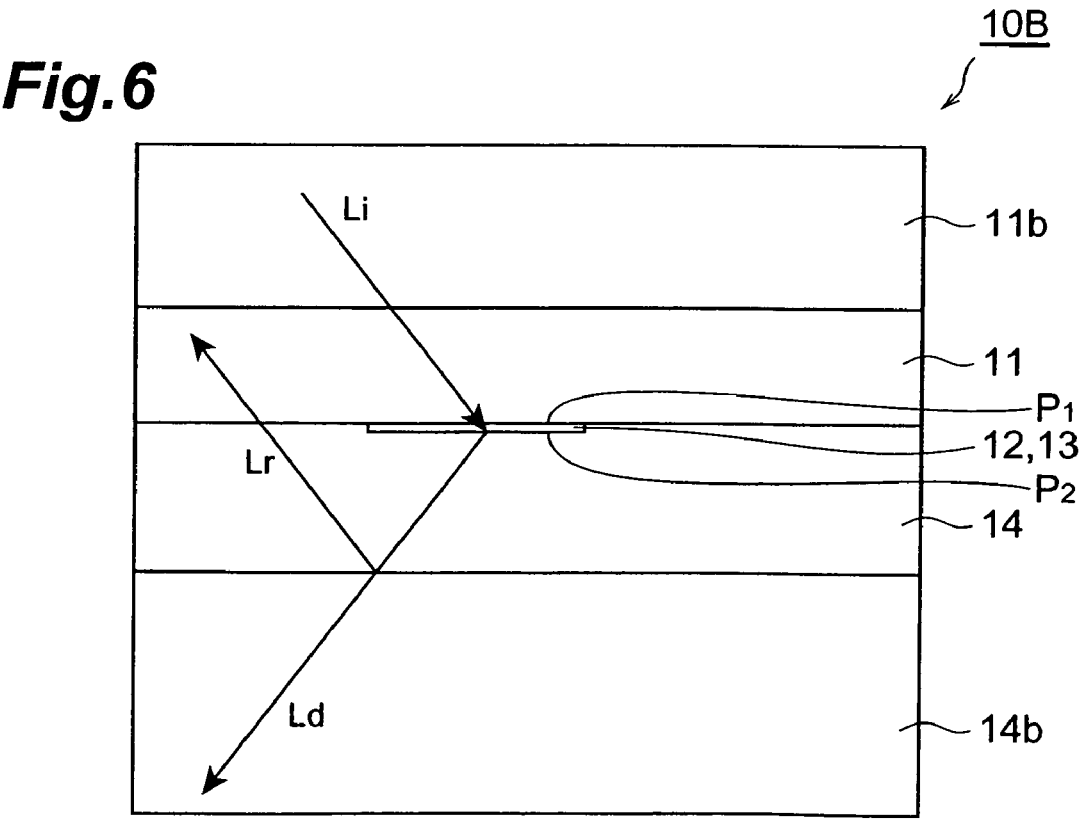
FIG. 6 is an explanatory diagram of a diffraction grating element 10B in accordance with a modified example 2.

FIG. 6 is an explanatory diagram of a diffraction grating element 10B in accordance with a modified example 2. In FIG. 6, an example of each locus of an incident light Li, a reflected light Lr from the boundary between the fourth medium 14 and the medium 14b and diffraction light Ld is shown. Compared with the constitution of the above-described diffraction grating element 10, in the diffraction grating element 10B of the modified example 2 shown in the diagram, the medium 11b (index of refraction no) resides at the outside (upper side in the diagram) of the first medium 11 (index of refraction $n_1$); and the medium 14b (index of refraction $n_5$) is resides at the outside (lower side in the diagram) of the fourth medium 14 (index of refraction $n_4$). For example, the outside medium 11b and the medium 14b are constituted of air or an optical glass for controlling the linear expansion coefficient of the entire diffraction grating element 10A to reduce the temperature dependence of the optical characteristics. Particularly, in the diffraction grating element 10B of the modified example 2, in order to prevent the reflected light, the transmitted light and the diffraction light, at the diffraction grating portion, from entering the diffraction grating portion again, each of the first medium 11 and the fourth medium 14 has a satisfactory thickness. Owing to this, the diffraction characteristics are prevented from being degraded.

(Second Embodiment)

Figure 7:
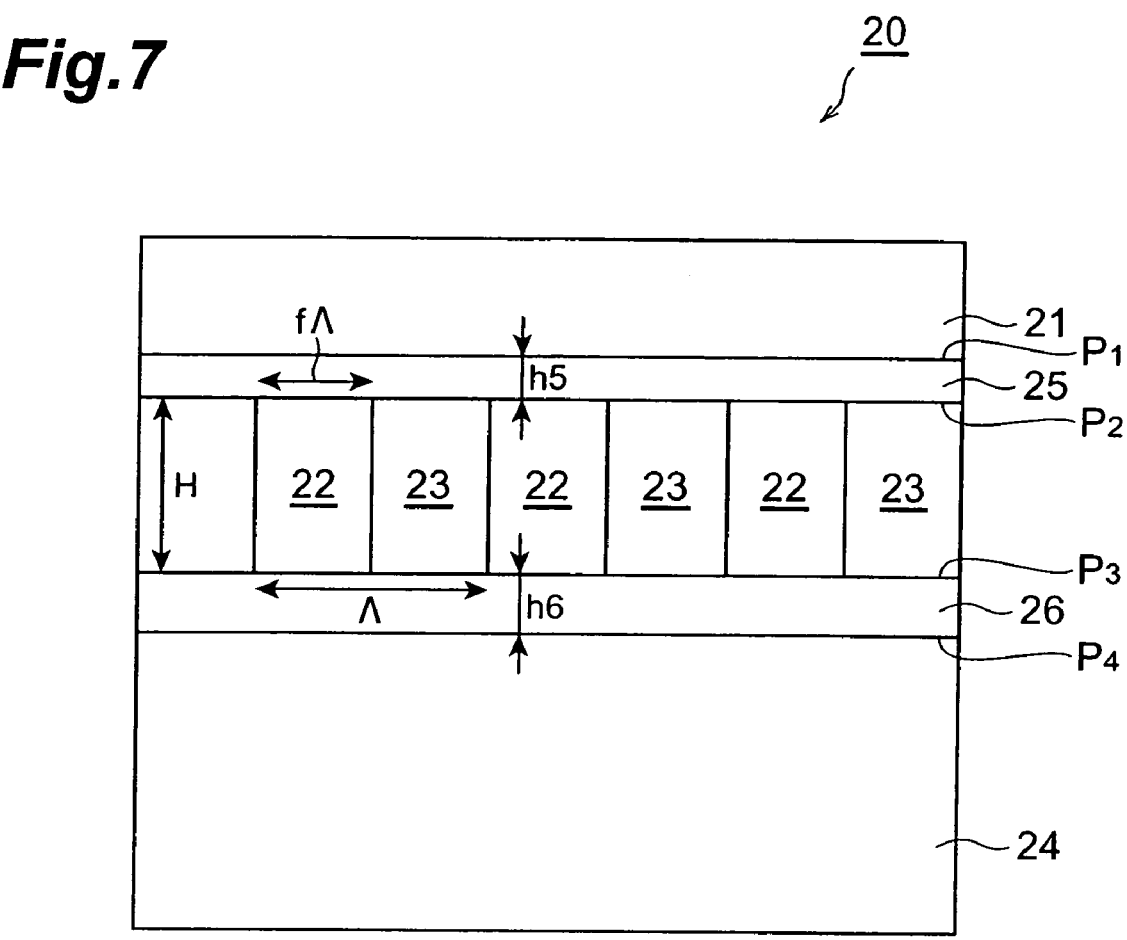
FIG. 7 is an explanatory diagram of a diffraction grating element 20 in accordance with a second embodiment.

Next, a second embodiment of a diffraction grating element in accordance with the present invention will be described. FIG. 7 is an explanatory diagram of a diffraction grating element 20 in accordance with a second embodiment. The diagram shows a section of the diffraction grating element 20 when the same is cut off at a plane perpendicular to the grating. The diffraction grating element 20 shown in the diagram comprises a first medium 21, a second medium 22, a third medium 23, a fourth medium 24, a fifth medium 25 and a sixth medium 26.

In this diffraction grating element 20, a first plane $P_1$, a second plane $P_2$, a third plane $P_3$ and fourth plane $P_4$, which are parallel to each other and aligned in order, are assumed. Here, the first medium 21 is provided at the outer side than the first plane $P_1$ (upper side in the diagram) being in contact with the first plane $P_1$. Between the second plane $P_2$ and the third plane $P_3$, the second medium 22 and the third medium 23 are disposed alternately in a predetermined direction parallel to the first plane $P_1$ being in contact with the second plane $P_2$ and the third plane $P_3$ so as to form a diffraction grating. The fourth medium 24 is provided at the outer side than the fourth plane $P_4$ (lower side in the diagram) being in contact with the fourth plane $P_4$. The fifth medium 25 is provided between the first plane $P_1$ and the second plane $P_2$ being in contact with the first plane $P_1$ and the second plane $P_2$. The sixth medium 26 is provided between the third plane $P_3$ and the fourth plane $P_4$ being in contact with the third plane $P_3$ and the fourth plane $P_4$.

In the diffraction grating element 20, between the fifth medium 25 and the sixth medium 26, the second medium 22 and the third medium 23 are disposed alternately to form a diffraction grating. The light, which enters the diffraction grating from the first medium 21, passes through the fifth medium 25 and is diffracted at the diffraction grating portion, and emitted to the fourth medium 24 through the sixth medium 26. Or, the light, which enters the diffraction grating from the fourth medium 24, passes through the sixth medium 26 and is diffracted at the diffraction grating portion, and emitted to the first medium 21 through the fifth medium 25.

Each region in the second medium 22 and the third medium 23 has a rectangular section. In the diffraction grating portion constituted of the diffraction grating, which is formed of the second medium 22 and the third medium 23 disposed alternately in a predetermined direction, it is assumed that the period of the diffraction grating is $\Lambda$; the ratio that the second medium 22 occupies in the period $\Lambda$ (duty ratio) is f. It is assumed that the distance between the first plane $P_1$ and the second plane $P_2$ (i.e., thickness of the fifth medium 25) is $h_5$. It is assumed that the distance between the second plane $P_2$ and the third plane $P_3$ (i.e., height of the grating) is H. It is assumed that the distance between the third plane $P_3$ and the fourth plane $P_4$ (i.e., thickness of the sixth medium 26) is $h_6$. It is assumed that index of refraction of the first medium 21 is $n_1$; the index of refraction of the second medium 22 is $n_2$; the index of refraction of the third medium 23 is $n_3$ ($n_3 < n_2$); the index of refraction of the fourth medium 24 is $n_4$; the index of refraction of the fifth medium 25 is $n_5$; and the index of refraction of the sixth medium 26 is $n_6$.

Here, the average index of refraction $n_{av}$ of the diffraction grating portion between the second plane $P_2$ and the third plane $P_3$ is expressed by the above expression (1). Also, between the index of refraction $n_2$ of the second medium 22 and the index of refraction $n_3$ of the third medium 23, the average index of refraction $n_{av}$ satisfies the above relational expression (2).

Each of the fifth medium 25 and the sixth medium 26 may be a multi-layered film for reducing the reflection, or may be a film of single layer. In the case of the film of single layer, the index of refraction $n_5$ of the fifth medium 25 satisfies the following relational expression:

$$n_1 < n_5 < n_{av}, \text{ or } n_{av} < n_5 < n_1 \quad (5)$$

The index of refraction $n_6$ of the sixth medium 26 satisfies the following relational expression:

$$n_4 < n_6 < n_{av}, \text{ or } n_{av} < n_6 < n_4 \quad (6)$$

The diffraction grating element 20 in accordance with this embodiment is arranged as described above; thereby the reflection at each boundary face is reduced, and the diffraction characteristics are prevented from being degraded.

Further, it is preferred that the index of refraction $n_5$ of the fifth medium 25 satisfies the following relational expression:

$$\sqrt{n_4 n_{av}} - 0.2 < n_5 < \sqrt{n_1 n_{av}} + 0.2 \quad (7)$$

Also, it is preferred that the index of refraction $n_6$ of the sixth medium 26 satisfies the following relational expression:

$$\sqrt{n_4 n_{av}} - 0.2 < n_6 < \sqrt{n_4 n_{av}} + 0.2 \quad (8)$$

Further, to reduce the reflection at the boundary face in a wide waveband, it is preferred that each of the height $h_5$ of the fifth medium 25 and the height $h_6$ of the sixth medium 26 are equal to or less than the wavelength order. For example, 5 μm or less is preferred.

Particularly, given that the angle of the light with a wavelength $\lambda$ in the fifth medium 25 is $\theta_5$, it is preferred that the thickness $h_5$ of the fifth medium 25 satisfies the following relational expression:

$$\frac{1}{2} \cdot \frac{\lambda}{4 n_5 \cos\theta_5} < h_5 < \frac{3}{2} \cdot \frac{\lambda}{4 n_5 \cos\theta_5} \quad (9)$$

Also, given that the angle of the light with a wavelength $\lambda$ in the sixth medium 26 is $\theta_6$, it is preferred that the thickness $h_6$ of the sixth medium 26 satisfies the following relational expression:

$$\frac{1}{2} \cdot \frac{\lambda}{4 n_6 \cos\theta_6} < h_6 < \frac{3}{2} \cdot \frac{\lambda}{4 n_6 \cos\theta_6} \quad (10)$$

Further, given that the light enters at Bragg angle, the above expression (9) is expressed by the following expression:

$$\frac{\lambda \Lambda}{4\sqrt{4 n_5^2 \Lambda^2 - \lambda^2}} < h_5 < \frac{3 \lambda \Lambda}{4\sqrt{4 n_5^2 \Lambda^2 - \lambda^2}} \quad (11)$$

The above expression (10) is expressed by the following expression:

$$\frac{\lambda \Lambda}{4\sqrt{4_6^2 \Lambda^2 - \lambda^2}} < h_6 < \frac{3 \lambda \Lambda}{4\sqrt{4 n_6^2 \Lambda^2 - \lambda^2}} \quad (12)$$

The above expression (11) and expression (12) are derived assuming Bragg incident angle. However, if not Bragg incident angle, the above expressions are approximately applicable.

In accordance with any of the above expressions (5)–(12), the index of refraction $n_1$–$n_6$ and the thickness $h_5$, $h_6$ of each medium are determined. After that, the diffraction characteristics of the diffraction grating element 20 are analyzed by means of the RCWA. The duty ratio f, the grating period $\Lambda$ and the height H of the grating are optimized by means of the optimizing technique; thereby the diffraction grating element 20 with satisfactory diffraction characteristics is designed.

The above description has been made assuming that each of the fifth medium 25 and the sixth medium 26 is constituted of a uniform film of a single layer. However, the fifth medium 25 or the sixth medium 26 may be constituted of a multi-layered film for reducing the reflection. In the case of multi-layered film, the reflection of the TE polarized light and the TM polarized light is controlled respectively and the diffraction efficiency is improved. Further, by utilizing the polarization dependence of the multi-layered film, the polarization dependence of the diffraction efficiency can be reduced. Furthermore, it is expected that the reflection of the high order diffraction light and the evanescent wave be also reduced.

Next, examples of the diffraction grating element 20 in accordance with of the second embodiment will be described. In the diffraction grating element 20 of the example 2, the first medium 21 was constituted of air ($n_1$=1); the second medium 22 was a SR-light irradiated portion of the DLC ($n_2$=2.15); the third medium 23 was a SR-light non-irradiated portion of the DLC ($n_3$=1.55); the fourth medium 24 was constituted of silica glass ($n_4$=1.45); the fifth medium 25 was constituted of silica glass ($n_5$=1.45); and the sixth medium 26 was constituted of MgO ($n_6$=1.70). The duty ratio f was 0.74; the grating period $\Lambda$ was 1.01 µm; the height H of the grating was 3.35 µm; the thickness $h_5$ of the fifth medium 25 was 0.30 µm; and the thickness $h_6$ of the sixth medium 26 was 0.23 µm.

Figure 8:
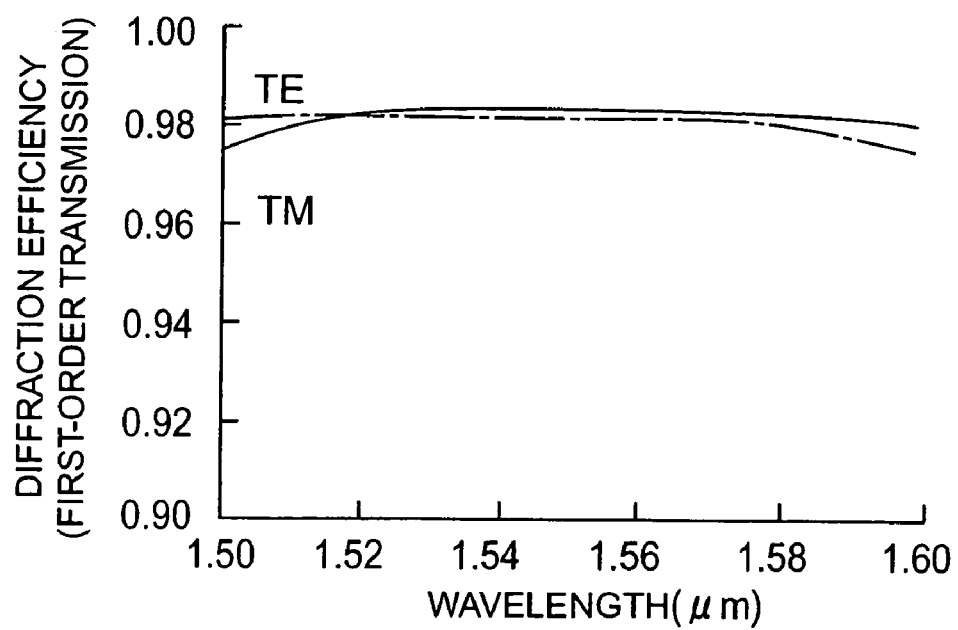
FIG. 8 is a graph showing the diffraction characteristics of the diffraction grating element 20 in accordance with an example 2.

FIG. 8 is a graph showing the diffraction characteristics of the diffraction grating element 20 of the example 2. In the diagram, the wavelength dependence of the diffraction efficiency when the incident angle $\theta$ of the light is the Bragg incident angle at a wavelength of 1.55 µm is shown with respect to the TE polarized light and the TM polarized light, respectively. Each parameter was designed so that the polarization dependence and the wavelength dependence of the diffraction efficiency was as small as possible, and the diffraction efficiency was as large as possible at a waveband of 1.52 µm–1.57 µm. As demonstrated in the diagram, in the case of the example 2 also, the diffraction efficiency of the TE polarized light and the TM polarized light were high as 95% or more, respectively, in a wide wavelength band. The difference of the diffraction efficiency between the TE polarized light and the TM polarized light was 2% or less. As described above, in the diffraction grating element 20 in accordance with this embodiment, it is possible to improve the diffraction efficiency and to reduce the polarization dependence of the diffraction efficiency in a wide wavelength band.

Next, a production method of the diffraction grating element 20 in accordance with the second embodiment will be described. Same as the case of the first embodiment, the diffraction grating element 20 in accordance with the second embodiment can be fabricated in accordance with the first production method, in which etching or lift-off is used, and the second production method using a predetermined material of which index of refraction can be changed by a radiation of an energy beam. In the second embodiment, it is preferred that the sixth medium 26 is constituted of a predetermined material of which etching rate is slower than that of the second medium 22 or third medium 23; any one of $Al_2O_3$, MgO, $Nd_2O_3$ and fluorinated compound ($AlF_3$, $MgF_2$, $CaF_2$, $NdF_3$ or the like) is preferred.

Next, a modified example of the diffraction grating element 20 in accordance with the second embodiment will be described. In the modified example of the diffraction grating element 20, both or any one of the fifth medium 25 and sixth medium 26 is comprised of a plurality of media, which are disposed alternately in a predetermined direction.

Figure 9:
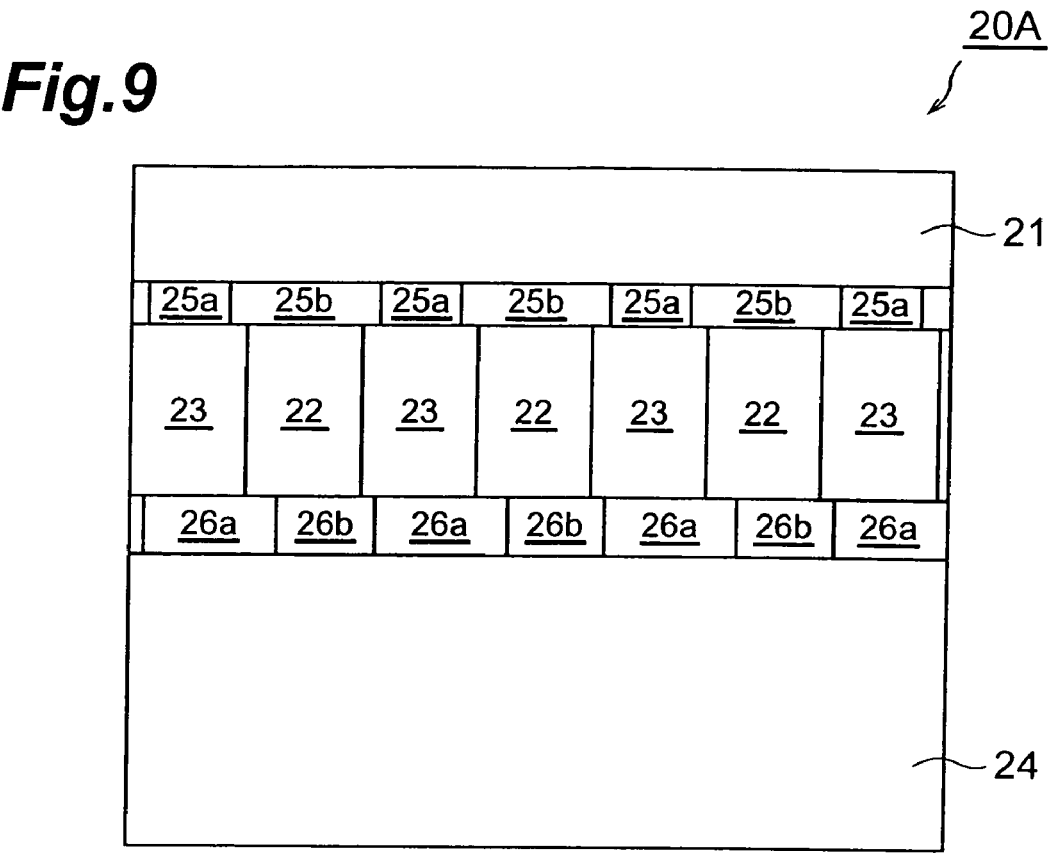
FIG. 9 is an explanatory diagram of a diffraction grating element 20A in accordance with a modified example.

FIG. 9 is an explanatory diagram of a diffraction grating element 20A in accordance with a modified example. Compared with the constitution of the above-described diffraction grating element 20, both of the fifth medium 25 and the sixth medium 26 of the diffraction grating element 20A of the modified example shown in the diagram are constituted of a plurality of media, which are disposed alternately in a predetermined direction. Here, the predetermined direction is the same direction where the second medium 22 and the third medium 23 are disposed alternately.

The fifth medium 25 is constituted of a medium 25a (index of refraction $n_{5a}$) and a medium 25b (index of refraction $n_{5b}$) being disposed alternately at $\Lambda_5$. The sixth medium 26 is constituted of a medium 26a (index of refraction $n_{6a}$) and a medium 26b (index of refraction $n_{6b}$) being disposed alternately at $\Lambda_6$. It is assumed that the ratio (duty ratio) that the medium 25a occupies the fifth medium 25 at period $\Lambda_5$ is $f_5$; and it is assumed that the ratio (duty ratio) that the medium 26a occupies the fifth medium 26 at period $\Lambda_6$ is $f_6$. It is preferred that each of the period $\Lambda_5$ of the fifth medium 25 and the period $\Lambda_6$ of the sixth medium 26 is equal to the period $\Lambda$ of the diffraction grating portion constituted of the second medium 22 and the third medium 23, or, equal to the period $\Lambda$ divided by an integer. Further, it is preferred that each of the period $\Lambda_5$ of the fifth medium 25 and the period $\Lambda_6$ of the sixth medium 26 is satisfactorily smaller than the wavelength $\lambda$ of the incident light; preferably, for example, ⅕ of the wavelength $\lambda$ or less.

Here, the average index of refraction $n_5$ of the fifth medium 25 is expressed by the following expression:

$$n_5 = \sqrt{f_5 n_{5a}^2 + (1-f_5) n_{5b}^2} \tag{13}$$

The average index of refraction $n_6$ of the sixth medium 26 is expressed by the following expression:

$$n_6 = \sqrt{f_6 n_{6a}^2 + (1-f_6) n_{6b}^2} \tag{14}$$

By using the average indexes of refraction $n_5$ and $n_6$, which are expressed by the above expression (13) and expression (14), it is possible to discuss same as the above-described diffraction grating element 20 (FIG. 7).

Figure 10:
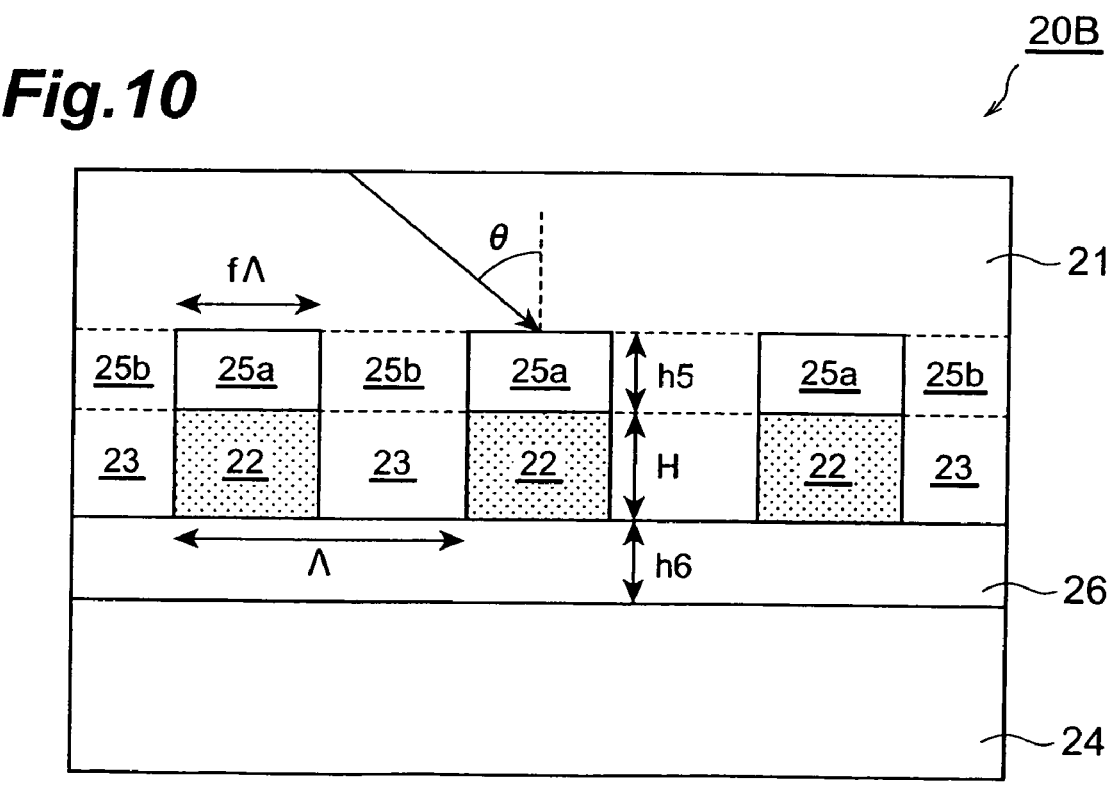
FIG. 10 is an explanatory diagram of a diffraction grating element 20B in accordance with an example 3.

Next, an example of the diffraction grating element 20 of the modified example will be described. FIG. 10 is an explanatory diagram of a diffraction grating element 20B in accordance with an example 3. In the diffraction grating element 20B of the example 3, the fifth medium 25 is constituted of two media 25a and 25b disposed alternately in a predetermined direction, and the sixth medium 26 is uniform. In the diffraction grating element 20B of the example 3, the first medium 21 was constituted of air ($n_1$=1); the second medium 22 was formed of $Ta_2O_5$ ($n_2$=2.0); the third medium 23 was constituted of air ($n_3$=1); the fourth medium 24 was formed of silica glass ($n_4$=1.45); in the fifth medium 25, the medium 25a was formed of silica glass ($n_{5a}$=1.45), and the medium 25b was constituted of air ($n_{5b}$=1); and the sixth medium 26 was formed of $Al_2O_3$ ($n_6$=1.60). The duty ratio f and $f_5$ were 0.66; the grating period Λ was 1.01 μm; the height H of the grating was 1.49 μm; the thickness $h_5$ of the fifth medium 25 was 0.36 μm; and the thickness $h_6$ of the sixth medium 26 was 0.34 μm.

Figure 11:
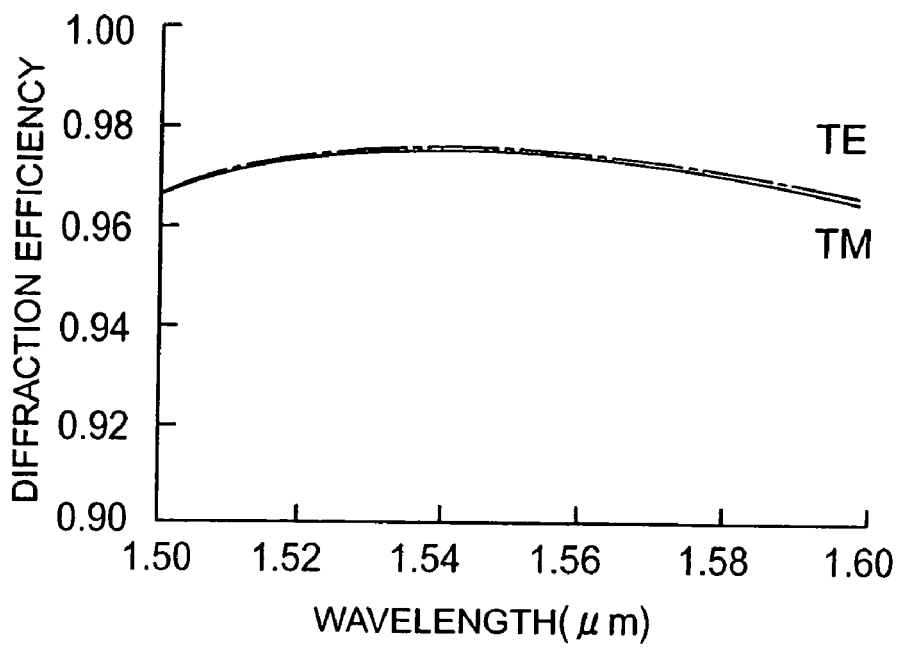
FIG. 11 is a graph showing the diffraction characteristics of the diffraction grating element 20B in accordance with an example 3.

FIG. 11 is a graph showing the diffraction characteristics of the diffraction grating element 20B of the example 3. In the diagram, the wavelength dependence of the diffraction efficiency when the incident angle θ (refer to FIG. 10) of the light is the Bragg incident angle at a wavelength of 1.55 μm is shown with respect to the TE polarized light and the TM polarized light, respectively. Each parameter was designed so that the polarization dependence and the wavelength dependence of the diffraction efficiency was as small as possible, and the diffraction efficiency was as large as possible at a waveband of 1.52 μm–1.57 μm. As demonstrated in the diagram, in the case of the example 3 also, the diffraction efficiency of the TE polarized light and the TM polarized light were high as 95% or more, respectively, in a wide wavelength band. The difference of the diffraction efficiency between the TE polarized light and the TM polarized light was 2% or less. As described above, in the diffraction grating element 20 in accordance with this embodiment, it is possible to improve the diffraction efficiency and to reduce the polarization dependence of the diffraction efficiency in a wide wavelength band.

Further, in the example 3, since the second medium 22 and the fifth medium 25 can be subjected to the etching simultaneously, fabrication thereof is easy. Here, as the sixth medium 26, it is preferred to use a predetermined material of which etching rate is slower than that of the second medium 22 and the fifth medium 25 for fabricating thereof. Also, it is possible to subject the second medium 22, the fifth medium 25 and the sixth medium 26 to the etching simultaneously. In such case, it is preferred that the etching rate of the fourth medium 24 is slow.

(Third Embodiment)

Figure 12:
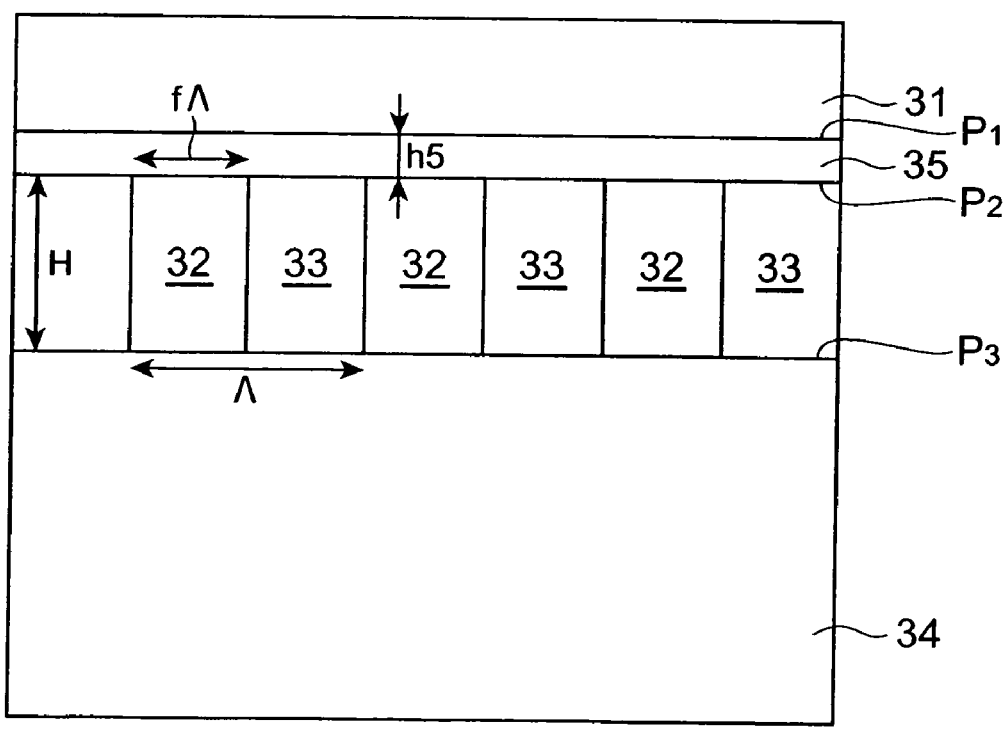
FIG. 12 is an explanatory diagram of a diffraction grating element 30 in accordance with a third embodiment.

Next, a third embodiment of a diffraction grating element in accordance with the present invention will be described. FIG. 12 is an explanatory diagram of a diffraction grating element 30 in accordance with the third embodiment. The diagram shows a section of the diffraction grating element 30 when the same is cut off at a plane perpendicular to the grating. The diffraction grating element 30 shown in the diagram comprises a first medium 31, a second medium 32, a third medium 33, a fourth medium 34, and a fifth medium 35.

In the diffraction grating element 30, a first plane $P_1$, a second plane $P_2$ and a third plane $P_3$, which are parallel to each other and aligned in order, are assumed. Here, the first medium 31 is provided at the outer side than the first plane $P_1$ (upper side in the diagram) being in contact with the first plane $P_1$. Between the second plane $P_2$ and the third plane $P_3$, the second medium 32 and the third medium 33 are disposed alternately in a predetermined direction parallel to the first plane $P_1$ being in contact with the second plane $P_2$ and the third plane $P_3$ to form a diffraction grating. The fourth medium 34 is provided at the outer side than the third plane $P_3$ (lower side in the diagram) being in contact with the third plane $P_3$. The fifth medium 35 is formed between the first plane $P_1$ and the second plane $P_2$ being in contact with the first plane $P_1$ and the second plane $P_2$.

In the diffraction grating element 30, between the fourth medium 34 and fifth medium 35, the second medium 32 and the third medium 33 are disposed alternately to form a diffraction grating. The light, which enters the diffraction grating from the first medium 31, passes through the fifth medium 35, and is diffracted at the diffraction grating portion and emitted to the fourth medium 34. Or, the light, which enters the diffraction grating from the fourth medium 34, is diffracted at the diffraction grating portion, and emitted to the first medium 31 through the fifth medium 35.

Each region in the second medium 32 and the third medium 33 has a rectangular section, respectively. In the diffraction grating portion formed with the diffraction grating, which is formed of the second medium 32 and the third medium 33 disposed alternately in a predetermined direction, it is assumed that the period of the diffraction grating is Λ; the ratio that the second medium 32 occupies in the period Λ (duty ratio) is f. It is assumed that the distance between the first plane $P_1$ and the second plane $P_2$ (i.e., thickness of the fifth medium 35) is $h_5$. It is assumed that the distance between the second plane $P_2$ and the third plane $P_3$ (i.e., height of the grating) is H. It is assumed that the index of refraction of the first medium 31 is $n_1$; the index of refraction of the second medium 32 is $n_2$; the index of refraction of the third medium 33 is $n_3$ ($n_3 < n_2$); the index of refraction of the fourth medium 34 is $n_4$; and the index of refraction of the fifth medium 35 is $n_5$.

Here, the average index of refraction $n_{av}$ of the diffraction grating portion between the second plane $P_2$ and the third plane $P_3$ is expressed by the above expression (1). Also, the average index of refraction $n_{av}$ is between the index of refraction $n_2$ of the second medium 32 and the index of refraction $n_3$ of the third medium 33, and satisfies the relational expression of the above expression (2).

Same as the case of the second embodiment, the fifth medium 35 may be formed of a multi-layer film for reducing the reflection, or may be a film of single layer. In the case of a film of single layer, the index of refraction $n_5$ of the fifth medium 35 satisfies the above-described relational expression (5). By being arranged as described above, in the diffraction grating element 30 in accordance with this embodiment, the reflection at the boundary face is reduced and the diffraction characteristics are prevented from being degraded. Further, it is preferred that the index of refraction $n_5$ of the fifth medium 35 satisfies the above relational expression (7).

Further, to reduce the reflection at the boundary face in a wide waveband, it is preferred that the height $h_5$ of the fifth medium 35 is equal to or less than the wavelength order. For example, 5 μm or less is preferred. Particularly, given that the angle of the light with a wavelength λ in the fifth medium 35 is $θ_5$, it is preferred that the thickness $h_5$ of the fifth medium 35 satisfies the above relational expression (9). Further, when the light enters at a Bragg angle, the above expression (9) is expressed by the above expression (11). The above expression (11) is derived assuming Bragg incident angle. However, if not Bragg incident angle, the above expression is approximately applicable.

Same as the case of the first embodiment, it is preferred that the index of refraction $n_4$ of the fourth medium 34 satisfies the above expression (3) or expression (4). By being arranged as described above, in the diffraction grating element 30 in accordance with this embodiment, the reflection at the boundary face is reduced, and the diffraction characteristics is prevented from being degraded.

In accordance with the above expressions, the index of refraction $n_1$–$n_3$ and the thickness $h_5$ of each medium are determined. After that, the diffraction characteristics of the diffraction grating element 30 are analyzed by means of the RCWA. The duty ratio f, the grating period Λ and the height of the grating H are optimized by means of the optimizing technique; thereby the diffraction grating element 30 with satisfactory diffraction characteristics is designed.

The above-description has been made assuming that the fifth medium 35 is a film of uniform single layer. However, the fifth medium 35 may be formed of a multi-layered film for reducing the reflection. In the case of multi-layered film, the reflection of the TE polarized light and the TM polarized light is controlled respectively and the diffraction efficiency is improved. Further, by utilizing the polarization dependence of the multi-layered film, the polarization dependence of the diffraction efficiency can be reduced. Furthermore, it is expected that the high diffraction light and the evanescent wave be also reduced.

Same as the modified example of the second embodiment, in this embodiment also, the fifth medium 35 may be formed of a plurality of media disposed alternately in a predetermined direction. Here, the average index of refraction $n_5$ of the fifth medium 35 is expressed by the above expression (13). By using the average index of refraction $n_5$ expressed by the above expression (13), it is possible to discuss same as the above-described diffraction grating element 30.

Next, a production method of the diffraction grating element 30 in accordance with the third embodiment will be described. Same as the case of the first embodiment, the diffraction grating element 30 in accordance with the third embodiment can be fabricated by a first production method, in which etching or lift-off is used; or a second production method using a predetermined material of which index of refraction can be changed by a radiation of an energy beam. It is preferred that the fourth medium 34 is formed of a predetermined material of which etching rate is slower than that of the second medium 32 and the third medium 33, from any one of the followings; i.e., $Al_2O_3$, $MgO$, $Nd_2O_3$ and a fluorinated compound ($AlF_3$, $MgF_2$, $CaF_2$, $NdF_3$ and the like).

Figure 13:
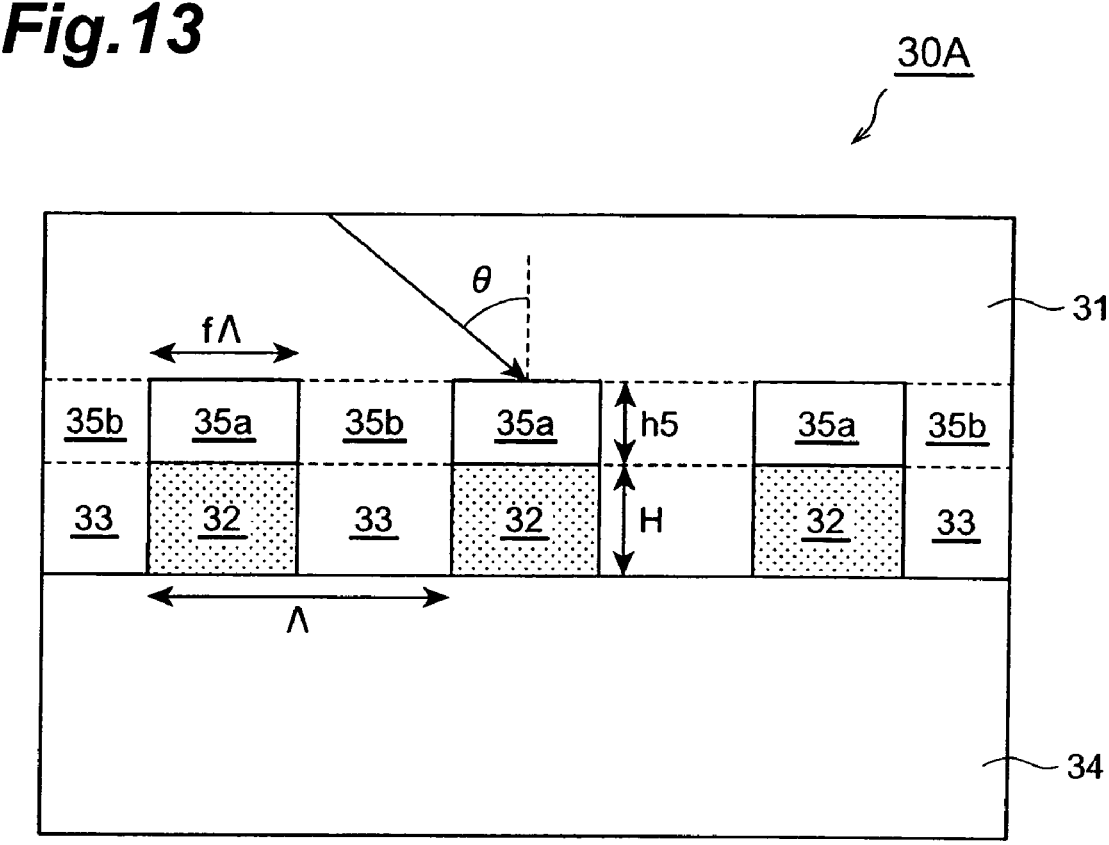
FIG. 13 is an explanatory diagram of a diffraction grating element 30A in accordance with an example 4.

Next, an example of the diffraction grating element 30 in accordance with the third embodiment will be described. FIG. 13 is an explanatory diagram of a diffraction grating element 30A in accordance with an example 4. In the diffraction grating element 30A of the example 4, the fifth medium 35 is formed of two media 35a and 35b disposed alternately in a predetermined direction. The diffraction grating element 30A of the example 4, the first medium 31 was constituted of air ($n_1$=1), the second medium 32 was formed of $Ta_2O_5$ ($n_2$=1.98), the third medium 33 was constituted of air ($n_3$=1), the fourth medium 34 was formed of silica glass ($n_4$=1.45); in the fifth medium 35, the medium 35a was formed of silica glass ($n_{5a}$=1.45), and the medium 35b was constituted of air ($n_{5b}$=1). The duty ratio f and $f_5$ were 0.60, the grating period Λ was 1.01 µm, the height H of the grating was 1.45 µm, and the thickness $h_5$ of the fifth medium 35 was 0.33 µm.

Figure 14:
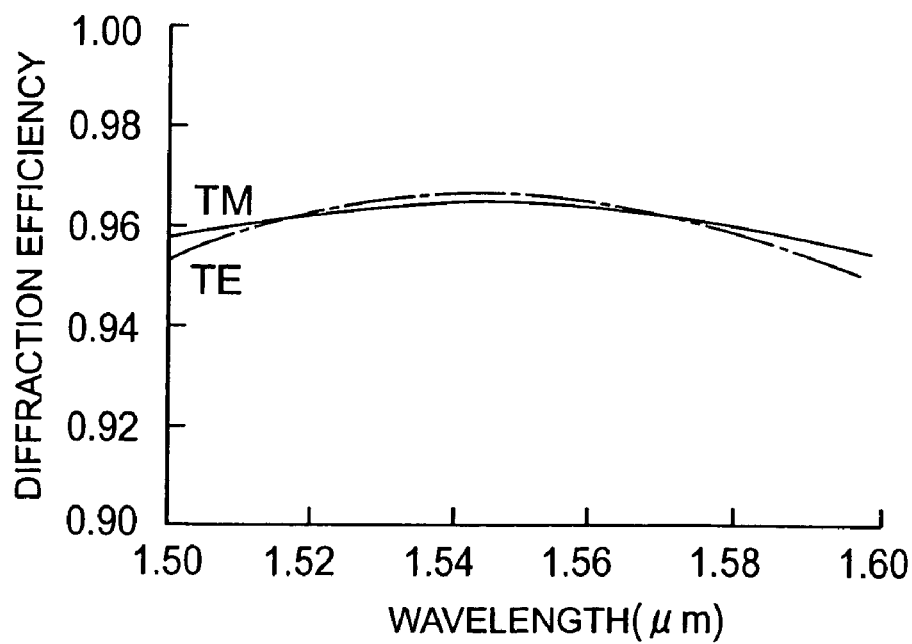
FIG. 14 is a graph showing the diffraction characteristics of the diffraction grating element 30A in accordance with an example 4.

FIG. 14 is a graph showing the diffraction characteristics of the diffraction grating element 30A of the example 4. In the diagram, the wavelength dependence of the diffraction efficiency when the incident angle θ (refer to FIG. 13) of the light is the Bragg incident angle at a wavelength of 1.55 µm is shown with respect to the TE polarized light and the TM polarized light, respectively. Each parameter was designed so that the polarization dependence and the wavelength dependence of the diffraction efficiency was as small as possible, and the diffraction efficiency was as large as possible at a waveband of 1.52 µm–1.57 µm. As demonstrated in the diagram, in the case of the example 4 also, the diffraction efficiency of the TE polarized light and the TM polarized light were high as 95% or more, respectively, in a wide wavelength band. The difference of the diffraction efficiency between the TE polarized light and the TM polarized light was 2% or less. As described above, in the diffraction grating element 30 in accordance with this embodiment, it is possible to improve the diffraction efficiency and to reduce the polarization dependence of the diffraction efficiency in a wide wavelength band. Further, in the example 4, since the second medium 32 and the fifth medium 35 can be subjected to the etching simultaneously, the fabrication thereof is easy.

(Fourth Embodiment)

Figure 15:
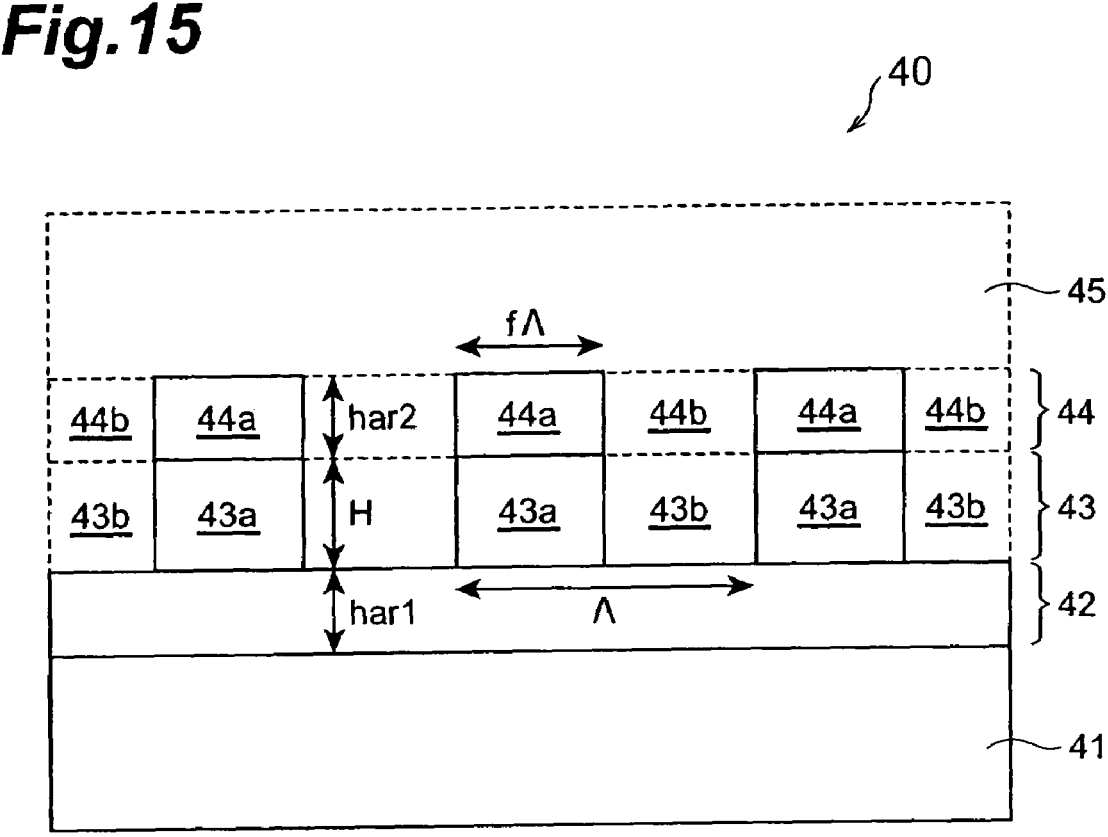
FIG. 15 is an explanatory diagram of a diffraction grating element 40 in accordance with a fourth embodiment.

A fourth embodiment of a diffraction grating element in accordance with the present invention will be described. FIG. 15 is an explanatory diagram of a diffraction grating element 40 in accordance with the fourth embodiment. The diagram shows a section of the diffraction grating element 40 when the same is cut off at a plane perpendicular to the grating. The diffraction grating element 40 shown in this diagram comprises a base plate 41, a first reflection-inhibiting portion 42, a diffraction grating portion 43, and a second reflection-inhibiting portion 44.

In the diffraction grating element 40, provided on the base plate 41 is the first reflection-inhibiting portion 42; provided on the first reflection-inhibiting portion 42 is the diffraction grating portion 43; and provided on the diffraction grating portion 43 is the second reflection-inhibiting portion 44. The second reflection-inhibiting portion 44 is in contact with the first medium 45. In the diffraction grating portion 43, the second medium 43a and the third medium 43b are disposed alternately in a predetermined direction substantially parallel to the base plate 41; thereby a diffraction grating is formed. In the second reflection-inhibiting portion 44, a medium 44a is provided on the second medium 43a; and a medium 44b is provided on the third medium 43b. The diffraction grating element 40 is designed so that the reflectance is 10% or less.

In the diffraction grating element 40, the light, which enters the diffraction grating from the first medium 45, passes through the second reflection-inhibiting portion 44 and diffracted at the diffraction grating portion 43, and emitted to the base plate 41 through the first reflection-inhibiting portion 42. Or, the light, which enters the diffraction grating from the base plate 41, passes through the first reflection-inhibiting portion 42 and is diffracted at the diffraction grating portion 43, and emitted to the first medium 45 through the second reflection-inhibiting portion 44.

Here, the diffraction grating portion 43 is defined as below. That is, given that the direction where the second medium 43a and the third medium 43b are disposed alternately is the x-direction; the direction where the first reflection-inhibiting portion 42, the diffraction grating portion 43, and the second reflection-inhibiting portion 44 are disposed in order is the z-direction. And given that the period of the diffraction grating is Λ; the ratio that the second medium 43a makes up in the period Λ (duty ratio) is f; the length of the first reflection-inhibiting portion 42 in the z-direction (i.e., height of the first reflection-inhibiting portion 42) is $h_{ar1}$; the length of the second reflection-inhibiting portion 44 in the z-direction (i.e., height of the second reflection-inhibiting portion 44) is $h_{ar2}$; and the length of the diffraction grating portion 43 in the z-direction (i.e., height of the grating) is H.

And given that the average index of refraction $n_{av}$ (z) is:

$$n_{av}(z) = \sqrt{\frac{\int_0^\Lambda n^2(x,z)dx}{\Lambda}}, \qquad (15)$$

the modulation of the index of refraction Δn (z) is:

$$\Delta n(z) = \sqrt{\frac{\Lambda \int_0^\Lambda \{n^2(x,z) - n_{av}^2(z)\}^2 dx}{\left\{\int_0^\Lambda n(x,z)dx\right\}^2}}, \text{ and} \qquad (16)$$

the diffraction capacity P (z1, z2) from a position z1 to a position z2 in the z-direction is:

$$P(z1,z2) = \int_{z1}^{z2} \Delta n(z) dz \qquad (17).$$

The diffraction grating portion 43 is defined as below; i.e., the diffraction capacity thereof is larger than 50% of the entire diffraction capacity including the first reflection-inhibiting portion 42, the diffraction grating portion 43 and the second reflection-inhibiting portion 44. Also, since the degrading of the characteristics due to the diffraction in the reflection-inhibiting portion is reduced, it is preferred that the modulation of the index of refraction in the diffraction grating portion 43 is larger than the modulation of the index of refraction in the first reflection-inhibiting portion 42 and the second reflection-inhibiting portion 44. Further, since the modulation of the index of refraction in the diffraction grating portion can be easily made larger, it is preferred that the maximum refraction in the diffraction grating portion 43 is larger than the index of refraction in the base plate 41 and the first medium 45. Furthermore, when the period Λ of the diffraction grating in the diffraction grating portion 43 is equal to or less than the wavelength of the light, the reflection is not only reduced, but also diffraction of a high order does not occur. Accordingly, it is preferred that the period Λ of the diffraction grating in the diffraction grating portion 43 is 1.675 μm or less.

In the diffraction grating element 40, given that the base plate 41 is formed of silica glass (index of refraction: 1.444); the second medium 43a of the diffraction grating portion 43 is formed of Ta$_2$O$_5$ (index of refraction: 2.107); the medium 44a of the second reflection-inhibiting portion 44 is formed of SiO$_2$; and the first medium 45, the third medium 43b and the medium 44b are constituted of air (index of refraction: 1), f and H of the diffraction grating portion 43 are designed by means of the RCWA; and $h_{ar1}$ and $h_{ar2}$ of the reflection-inhibiting portions are designed by means of an analysis based on an equivalent model, which will be described below.

The analysis based on the equivalent model is a method as described below. That is, given that the first reflection-inhibiting portion 42, the diffraction grating portion 43 and the second reflection-inhibiting portion 44 is formed of a single layer film respectively, and each of them has an average index of refraction of the medium included therein; and given that the phase change of the light by the diffraction in the diffraction grating portion 43 is 90°, and replacing the diffraction grating element 40 with a multi-layer film, the diffraction efficiency of the first-order transmission and the diffraction efficiency of the zero-order reflection are analyzed. The transmittance and the reflectance of the multi-layer film are equivalent to the first-order transmission diffraction efficiency and the zero-order reflection diffraction efficiency in the diffraction grating element 40 respectively. Accordingly, by using the equivalent model, the designing theory of the multi-layer film, which is represented by an optical filter, becomes applicable; thus, the reducing design of the zero-order reflection diffraction efficiency in the diffraction grating element 40 can be made easily. Finally, a fine adjustment of the designs of f, H, $h_{ar1}$ and $h_{ar2}$ is preferably made on the entire diffraction grating element 40 using the RCWA, which has high accuracy in analysis.

Figure 16:
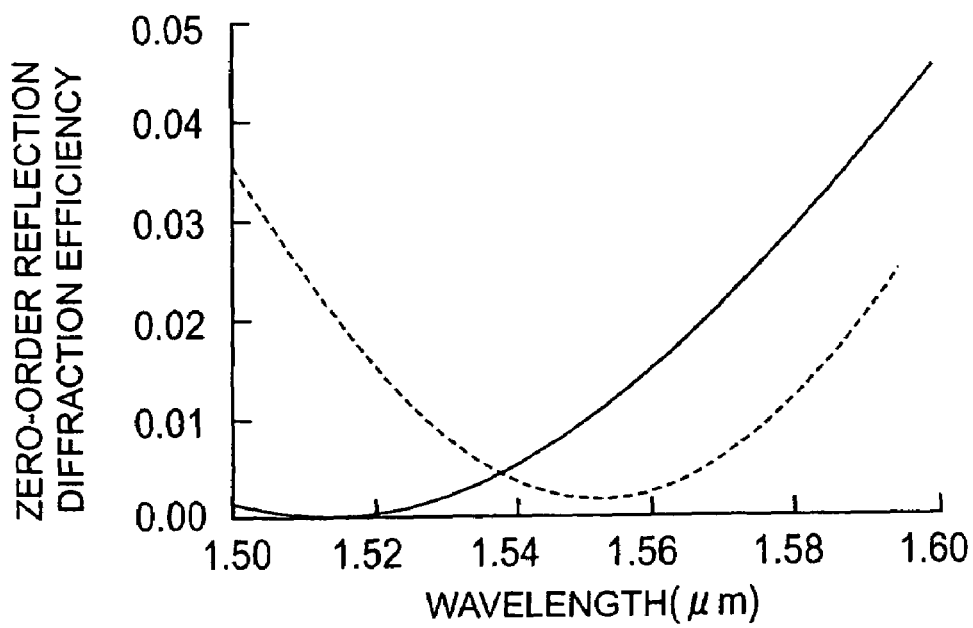
FIG. 16 is a graph showing the characteristics of the zero-order reflection diffraction efficiency of the diffraction grating element in accordance with the fourth embodiment and the zero-order reflection diffraction efficiency of the equivalent model.

FIG. 16 is a graph showing the characteristics of the zero-order reflection diffraction efficiency of the diffraction grating element in accordance with the fourth embodiment and the zero-order reflection diffraction efficiency of the above-described equivalent model. The graph shows the characteristics of the zero-order reflection diffraction efficiency of the diffraction grating element 40 which is actually fabricated and the above-described equivalent model under the conditions that period Λ=1.0 μm, f=0.579, H=1.164 μm, $h_{ar2}$=0.252 μm, $h_{ar1}$=−0.2 μm, the waveband of the light is 1550 nm band (C band) and the incident angle θ of the light is 50.58°. Here, $h_{ar1}$ is a minus value. The absolute value thereof represents the thickness of the first reflection-inhibiting portion; the sign represents the structure of the reflection-inhibiting portion as described later. In FIG. 16, the characteristics indicated with the broken line represents a result of analysis of the diffraction grating element 40, which was actually fabricated; and the characteristics indicated with the solid line represents a result of analysis using the above-described equivalent model. As is demonstrated in the graph, although a minute difference is found in the central wavelength, according to the designing method using the equivalent model, precise characteristics of the diffraction grating element 40 of the embodiment can be obtained.

The diffraction grating element 40 is designed by optimizing f, H, $h_{ar1}$ and $h_{ar2}$ by applying the designing method in which the above-described equivalent model is used. In this design, under such conditions that the waveband of the light is 1550 nm band (C band) and the incident angle θ of the light is 50.58°, the optimization is made in a range of $h_{ar1}$ from −0.5 μm to 0.3 μm (0.1 μm interval).

Figure 17:
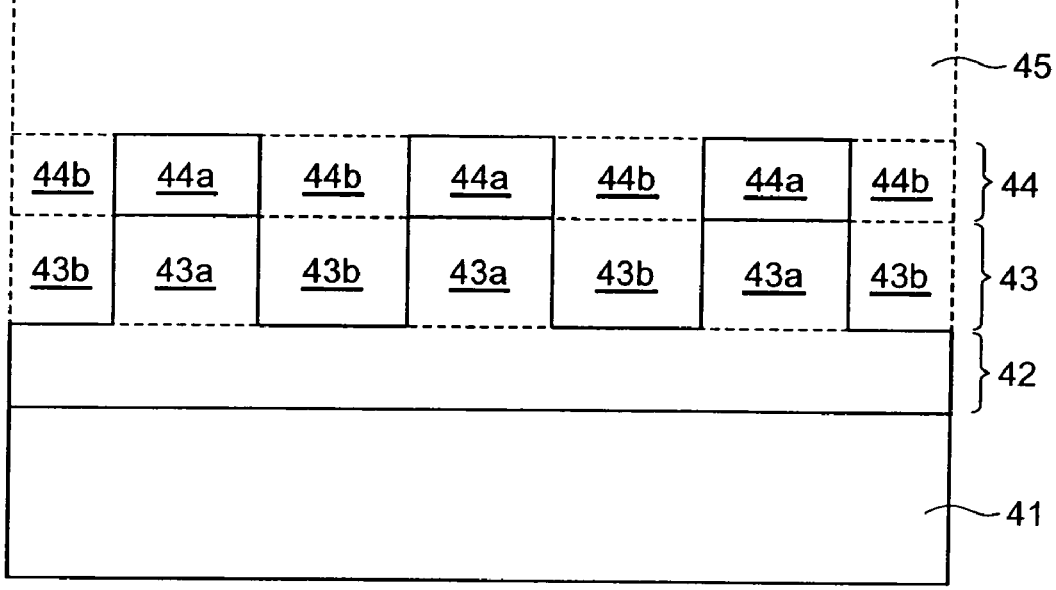
FIG. 17 is an explanatory diagram of a diffraction grating element 40A in accordance with an example 5.
Figure 18:
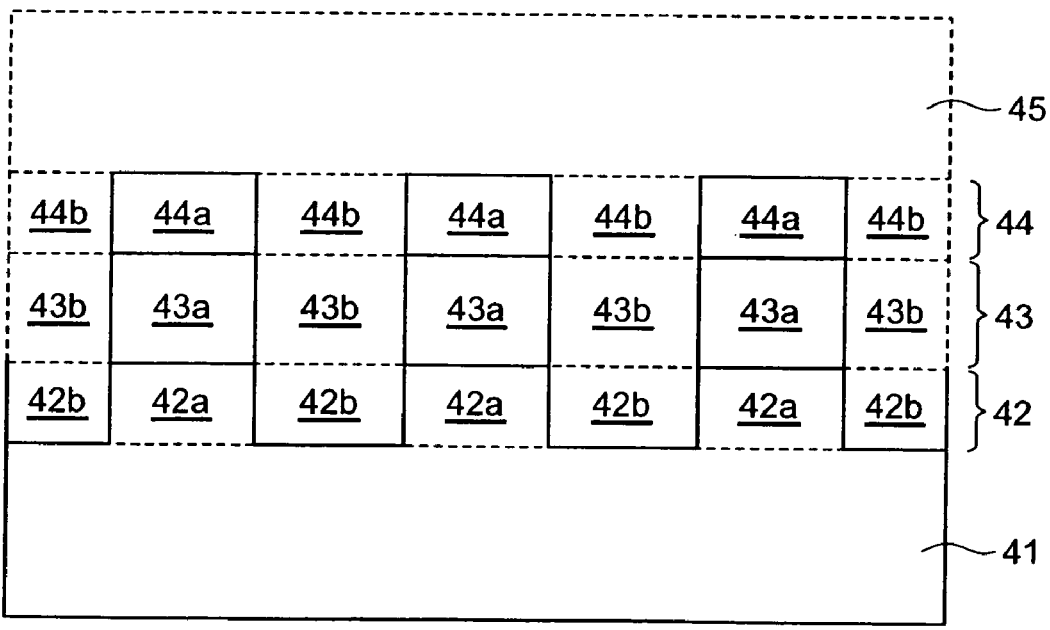
FIG. 18 is an explanatory diagram of a diffraction grating element 40B in accordance with an example 6.

Here, when the $h_{ar1}$ is a positive number, the following fact is indicated; i.e., that the first reflection-inhibiting portion 42 is formed of the same medium as the medium 43a of the diffraction grating portion 43. Also, when the $h_{ar1}$ is a minus number, the following fact is indicated; i.e., the first reflection-inhibiting portion 42 is formed of the same medium as the medium of the base plate 41. FIG. 17 is an explanatory diagram of a diffraction grating element 40A in accordance with an example 5. FIG. 18 is an explanatory diagram of a diffraction grating element 40B in accordance with an example 6. Both of FIG. 17 and FIG. 18 show a section of the diffraction grating element taken away at a plane perpendicular to the grating, respectively.

The diffraction grating element 40A is an example of the diffraction grating element 40 of the fourth embodiment when $h_{ar1}$ is a plus number. The diffraction grating element 40B is an example of the diffraction grating element 40 of the fourth embodiment when $h_{ar1}$ is a minus number. The diffraction grating element 40A is fabricated by carrying out an etching on the second medium 43a, which is formed all over the surface of the base plate 41, and the etching is terminated before reaching the base plate 41. Accordingly, the same medium as the second medium 43a forms the first reflection-inhibiting portion 42.

On the other hand, the diffraction grating element 40B is an example of the diffraction grating element 40 of the fourth embodiment when $h_{ar1}$ is a minus number. The diffraction grating element 40B is fabricated by, for example, carrying out an etching on the second medium 43a, which is formed all over the surface of the base plate 41, and the etching is carried out until a part of the base plate 41 is etched. Accordingly, the diffraction grating element 40B is constituted of the medium 42a and the medium 42b formed alternately; the medium 42a is the same medium as that of the base plate 41, and the medium 42b is constituted of air.

Figure 19:
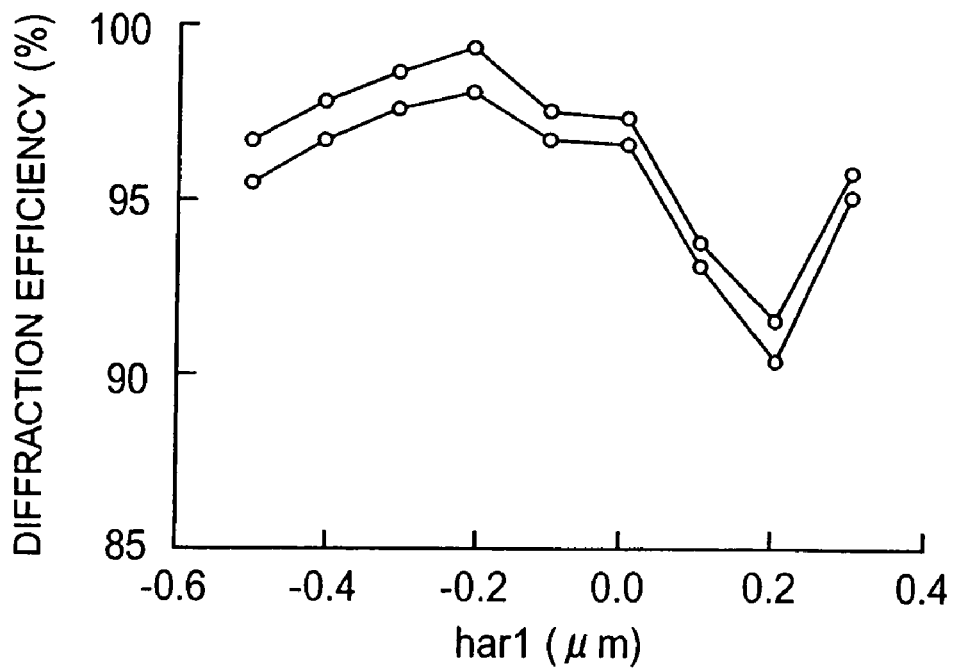
FIG. 19 is a graph showing the diffraction efficiency of the diffraction grating element in accordance with the fourth embodiment.
Figure 20:
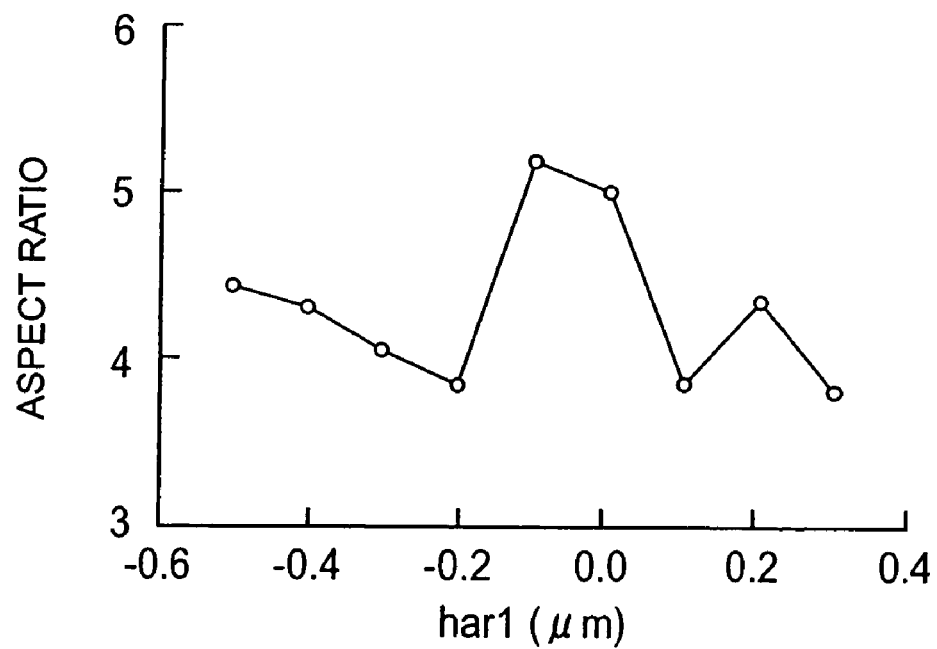
FIG. 20 is a graph showing the aspect ratio of grooves in the diffraction grating element in accordance with the fourth embodiment.
Figure 21:
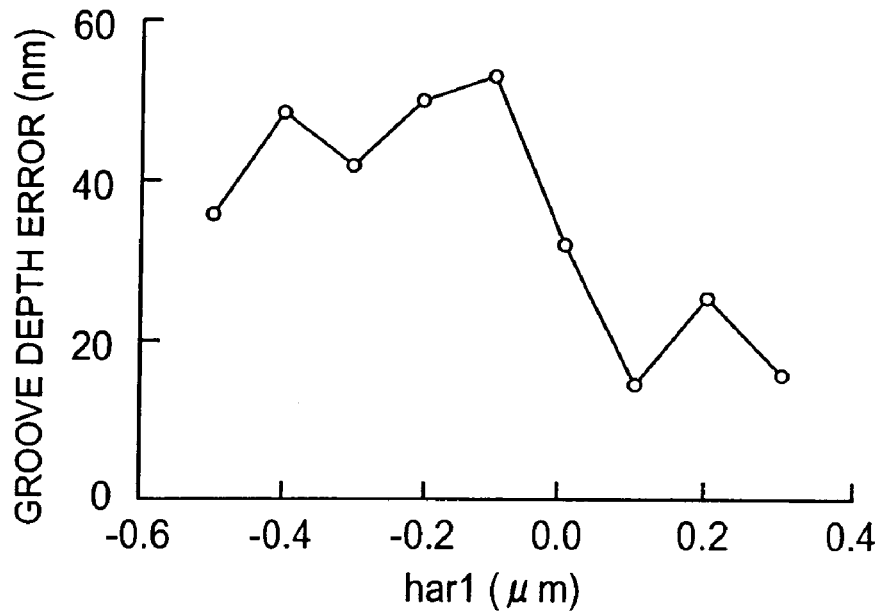
FIG. 21 is a graph showing the tolerance of groove depth in the diffraction grating element in accordance with the fourth embodiment.

The results of the above optimization are shown in the table 1 and FIG. 19–FIG. 21.

TABLE 1

| | $h_{ar1}$ (μm) | f | H (μm) | $h_{ar2}$ (μm) | Aspect ratio | Minimum diffraction efficiency (%) | Maximum diffraction efficiency (%) |
|---|---|---|---|---|---|---|---|
| 1 | −0.500 | 0.580 | 1.119 | 0.241 | 4.43 | 95.4 | 96.6 |
| 2 | −0.400 | 0.587 | 1.115 | 0.267 | 4.31 | 96.7 | 97.7 |
| 3 | −0.300 | 0.581 | 1.141 | 0.256 | 4.05 | 97.6 | 98.6 |
| 4 | −0.200 | 0.579 | 1.164 | 0.252 | 3.84 | 98.0 | 99.2 |
| 5 | −0.100 | 0.649 | 1.293 | 0.423 | 5.17 | 96.7 | 97.4 |
| 6 | 0.000 | 0.656 | 1.308 | 0.408 | 4.99 | 96.5 | 97.2 |
| 7 | 0.100 | 0.576 | 1.213 | 0.412 | 3.84 | 93.1 | 93.7 |
| 8 | 0.200 | 0.644 | 1.256 | 0.288 | 4.34 | 90.3 | 91.5 |
| 9 | 0.300 | 0.590 | 1.238 | 0.316 | 3.79 | 94.9 | 95.6 |

FIG. 19 is a graph showing the diffraction efficiency of the diffraction grating element in accordance with the fourth embodiment. FIG. 19 shows the plotted minimum diffraction efficiency and the maximum diffraction efficiency, which are listed in the table 1. Here, the wording maximum diffraction efficiency and minimum diffraction efficiency means the maximum diffraction efficiency and the minimum diffraction efficiency in the C band including the TE polarized light and the TM polarized light. According to the table 1 and FIG. 19, it is demonstrated that the diffraction grating element 40 has the diffraction efficiency of 90% or more, and the polarization dependence thereof is small. In the first-third embodiments, an AR layer is formed on the diffraction grating portion which is formed of the second medium and third medium. That is, a layer for absorbing difference of the index of refraction between the medium, which is on the outside of the diffraction grating portion, and the diffraction grating portion is formed; and thereby reflected light is prevented from returning. Contrary to this, the reflection-inhibiting portion of the diffraction grating element 40 has the average index of refraction of which conditions are different from those of the AR layer in the first–third embodiments. However, the AR layer between the base plate 41 and the first medium 45 is constituted of a multi-layer film including the first reflection-inhibiting portion 42, the diffraction grating portion 43 and the second reflection-inhibiting portion 44; thereby the entire reflection in the diffraction grating element 40 is controlled.

FIG. 20 is a graph showing the aspect ratio of the grooves in the diffraction grating element in accordance with the fourth embodiment. According to FIG. 20, when $h_{ar1}$ is −0.2 μm or 0.1 μm, since the aspect ratio is particularly small, it is understood that the diffraction grating portion 43 can be formed easily.

FIG. 21 is a graph showing the tolerance of groove depth of the diffraction grating element in accordance with the fourth embodiment. Here, the wording "tolerance of groove depth" means a tolerance of changes of $h_{ar1}$ when the changes of the diffraction efficiency allowed by 1%; i.e., an error of groove depth. According to FIG. 21, when $h_{ar1}$ is approximately −0.2 μm, tolerance of the error of groove depth is large. Accordingly, it is understood that the diffraction grating element 40 can be fabricated easily.

MODIFIED EXAMPLE

The present invention is not limited to the above-described embodiments, but a variety of modifications are conceivable. For example, in each of the above embodiments, the configuration of the section of each region in the second medium and the third medium, which constitute the diffraction grating portion, is a rectangle. However the configuration is not always required to be rectangle, but, for example, the configuration may be a trapezoid. In the above-described examples, the duty ratio f, $f_5$ and $f_6$ are equal to each other. They may be different from each other. If so, the diffraction characteristics can be further increased. Further, in the diffraction grating element of each embodiment, the light may enter from the first medium side, or the light may enter from the fourth medium side.

Figure 22:
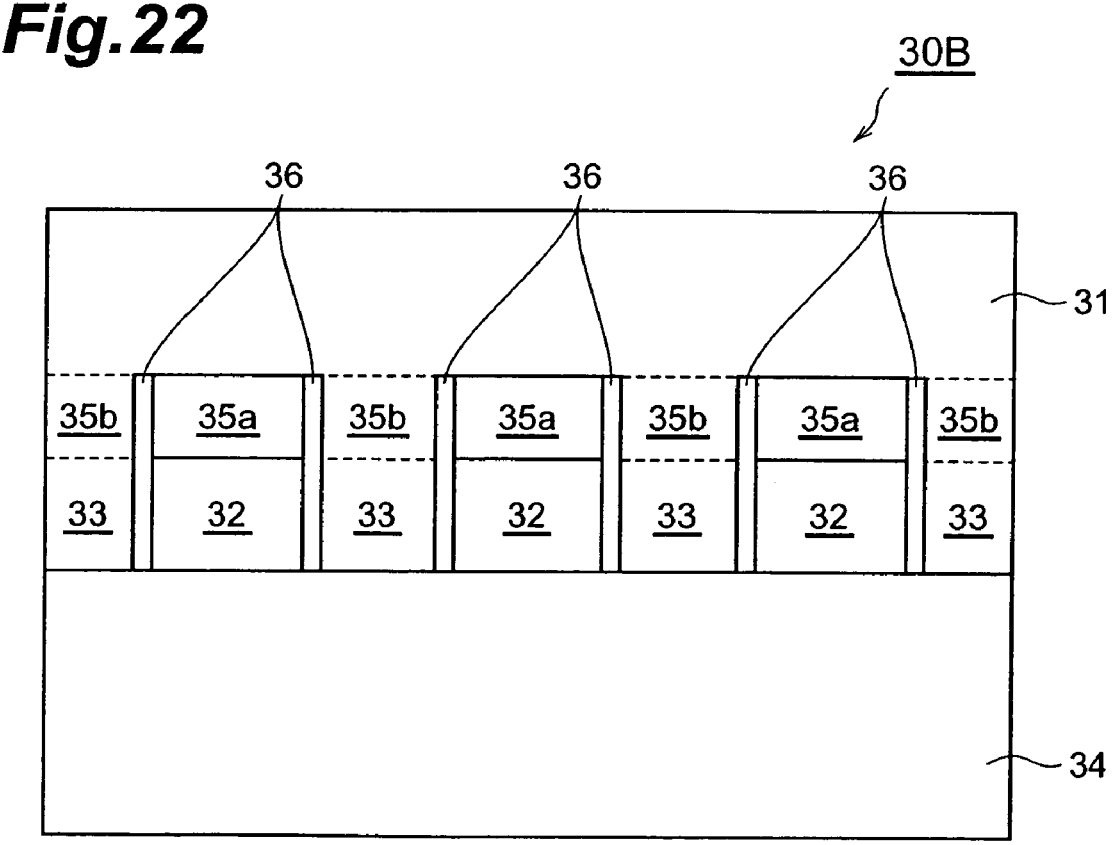
FIG. 22 is an explanatory diagram of a diffraction grating element 30B in accordance with a mode of modification.

Furthermore, in the above-described embodiments, the second medium and the third medium are disposed alternately being in contact with each other to form the diffraction grating portion. However, a different medium may be provided between the second medium and the third medium. Such example of modification mode will be described taking the diffraction grating element 30A in accordance with the example of the third embodiment as an example. FIG. 22 is an explanatory diagram of a diffraction grating element 30B in accordance with a mode of modification. FIG. 22 shows a section of the diffraction grating element, which is cut off at a plane perpendicular to the grating. The diffraction grating element 30B shown in FIG. 22 has the same constitution as that of the diffraction grating element 30A; but between the second medium 32 and the third medium 33, a medium 36 is formed. For example, in the case where the medium 35a is formed of $SiO_2$, and when a process for adhering $SiO_2$ while etching the second medium 32 is introduced in order to supplement defects on side walls of the medium 35a due to the etching, a diffraction grating element 30B in which the medium 36 is formed of $SiO_2$ is fabricated. Also, in the case where the medium 32 is formed of $Ta_2O_5$, and when a process for adhering $Ta_2O_5$ while etching the second medium 32 is introduced in order to supplement defects on side walls of the medium 32 due to the etching, a diffraction grating element 30B in which the medium 36 is formed of $Ta_2O_5$ is fabricated.

Each example is designed based on the waveband of 1.5 μm–1.6 μm, but is not limited thereto. In the designing of the diffraction grating, the law of similitude is applicable. Accordingly, for example, when altering the central wavelength from 1.55 μm to 1.3 μm, the alteration is achieved only by multiplying every designing parameter (period and thickness) having a unit of length by 1.3/1.55. As described above, the diffraction grating having a central wavelength within a waveband of 1.26 μm–1.675 μm, which is used in the optical communication, can be designed easily.

What is claimed is:

1. A diffraction grating element, comprising:
given first-third planes disposed parallel with each other in order, a first medium having an index of refraction $n_1$ provided at the outer side than the first plane being in contact with the first plane,
a second medium having an index of refraction $n_2$ and a third medium having an index of refraction $n_3$, $n_3<n_2$ disposed alternately in a predetermined direction parallel with the first plane between the second plane and the third plane being in contact with the second plane and the third plane to constitute a diffraction grating, a fourth medium having an index of refraction $n_4$ provided at the outer side than the third plane being in contact with the third plane, and a fifth medium having an average index of refraction $n_5$ provided between the first plane and the second plane being in contact with the first plane and the second plane, wherein given that the average index of refraction between the second plane and the third plane is $n_{av}$, the average index of refraction $n_5$ of the fifth medium satisfies a relational expression of "$n_1 < n_5 < n_{av}$" or "$n_{av} < n_5 < n_1$".

2. The diffraction grating element according to claim 1, wherein the average index of refraction $n_5$ of the fifth medium satisfies a relational expression of "$(n_1 n_{av})^{1/2} - 0.2 < n_5 < (n_1 n_{av})^{1/2} + 0.2$".

3. The diffraction grating element according to claim 1, wherein, given that the period of the diffraction grating is $\Lambda$; the thickness of the fifth medium with respect to a direction perpendicular to the first plane is $h_5$; and light of a wavelength $\lambda$ enters the diffraction grating, the wavelength $\lambda$ of light that satisfies a relational expression of "$\lambda\Lambda/4(4n_5^2\Lambda^2 - \lambda^2)^{1/2} < h_5 < 3\lambda\Lambda/4(4n_5^2\Lambda^2 - \lambda^2)^{1/2}$" is present in a waveband of 1.26 μm–1.675 μm.

4. The diffraction grating element according to claim 1, wherein the fifth medium is made of a plurality of media disposed alternately in the predetermined direction.

5. The diffraction grating element according to claim 1, wherein each index of refraction $n_2$–$n_4$ of the second medium, the third medium and the fourth medium satisfies a relational expression of "$n_3 < n_4 < n_2$".

6. The diffraction grating element according to claim 5, wherein the index of refraction $n_4$ of the fourth medium satisfies a relational expression of "$n_{av} - 0.2 \leq n_4 \leq n_{av} + 0.2$".

7. The diffraction grating element according to claim 5, wherein the thickness of the fourth medium with respect to a direction perpendicular to the first plane is 5 μm or more.

8. The diffraction grating element according to claim 1, wherein a wavelength of the light in which the diffraction efficiency of the TE polarized light and the TM polarized light is 90% or more, respectively, is present.

9. The diffraction grating element according to claim 1, wherein a wavelength of light in which the difference of the diffraction efficiency between TE polarized light and TM polarized light is 5% or less is present.

10. The diffraction grating element according to claim 1, wherein the difference between the index of refraction $n_2$ of the second medium and the index of refraction $n_3$ of the third medium is 0.7 or more.

11. The diffraction grating element according to claim 10, wherein the second medium is any one of $TiO_2$, $Ta_2O_5$ and $Nb_2O_5$, and the third medium is a gaseous matter.

12. The diffraction grating element according to claim 1, wherein the second medium or the third medium is made of a predetermined material of which index of refraction changes by an irradiation of energy beam.

13. The diffraction grating element according to claim 12, wherein the predetermined material is a diamond-like carbon.

14. The diffraction grating element according to claim 1, wherein the first medium, the fourth medium or the fifth medium is made of a predetermined material of which etching rate is slower than that of the second medium or the third medium.

15. The diffraction grating element according to claim 14, wherein the predetermined material is any one of $Al_2O_3$, $MgO$, $Nd_2O_3$ and a fluorinated compound.

16. The diffraction grating element according to claim 14, wherein the second medium or the third medium is any one of $TiO_2$, $Nb_2O_5$, $Ta_2O_5$, $SiN$, $SiO_2$, $SiO$, $ZrO_2$ and $Sb_2O_3$.

17. The diffraction grating element according to claim 1, wherein the second medium and the third medium are in contact with each other.

* * * * *